(12) United States Patent
Mori et al.

(10) Patent No.: US 8,724,145 B2
(45) Date of Patent: May 13, 2014

(54) DISPLAY INPUT DEVICE, IMAGE FORMING APPARATUS, AND DISPLAY METHOD OF THE DISPLAY INPUT DEVICE

(75) Inventors: Nobuyasu Mori, Osaka (JP); Dai Shigenobu, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 579 days.

(21) Appl. No.: 13/005,108

(22) Filed: Jan. 12, 2011

(65) Prior Publication Data

US 2011/0205577 A1 Aug. 25, 2011

(30) Foreign Application Priority Data

Feb. 19, 2010 (JP) ................... 2010-034846

(51) Int. Cl.
*G06F 3/12* (2006.01)
*H04N 1/00* (2006.01)
*G06F 3/00* (2006.01)

(52) U.S. Cl.
USPC .......... 358/1.15; 358/1.13; 358/1.1; 358/400; 358/402; 715/745; 715/744; 715/762

(58) Field of Classification Search
None
See application file for complete search history.

(56) References Cited

U.S. PATENT DOCUMENTS

| | | | | |
|---|---|---|---|---|
| 5,539,530 A | * | 7/1996 | Reifman et al. | 358/402 |
| 7,536,646 B2 | * | 5/2009 | Singh et al. | 715/745 |
| 8,184,309 B2 | * | 5/2012 | Koshika et al. | 358/1.14 |
| 8,223,383 B2 | * | 7/2012 | Tran et al. | 358/1.16 |
| 2002/0105547 A1 | | 8/2002 | Marchionda et al. | |
| 2005/0270557 A1 | * | 12/2005 | Ookuma | 358/1.13 |
| 2006/0136488 A1 | | 6/2006 | Mifune et al. | |
| 2008/0170259 A1 | * | 7/2008 | Koshika et al. | 358/1.15 |
| 2010/0053687 A1 | * | 3/2010 | Matsuda | 358/3.24 |
| 2012/0120435 A1 | * | 5/2012 | Osada | 358/1.13 |
| 2012/0243016 A1 | * | 9/2012 | Amano | 358/1.13 |
| 2012/0314257 A1 | * | 12/2012 | Osada | 358/1.15 |
| 2013/0293914 A1 | * | 11/2013 | Osada | 358/1.13 |

FOREIGN PATENT DOCUMENTS

| | | |
|---|---|---|
| JP | 8-286571 | 11/1996 |
| JP | 11-24511 | 1/1999 |
| JP | 2002-307790 | 10/2002 |
| JP | 2006-180289 | 7/2006 |
| JP | 2009-116377 | 5/2009 |

* cited by examiner

Primary Examiner — Satwant Singh
(74) Attorney, Agent, or Firm — Smith, Gambrell & Russell, LLP

(57) ABSTRACT

A display input device includes a display unit which displays a plurality of types of functions as set items, a program which is called to control the display unit to display a screen for setting set items selected and registered in advance, a storage unit which stores information about whether or not to display a set item when the program is called as contents of the program, an input unit which accepts an input about whether or not to display the set items when the program is called, and a display control unit which controls the display unit not to display a set item that is determined to be no display.

13 Claims, 18 Drawing Sheets

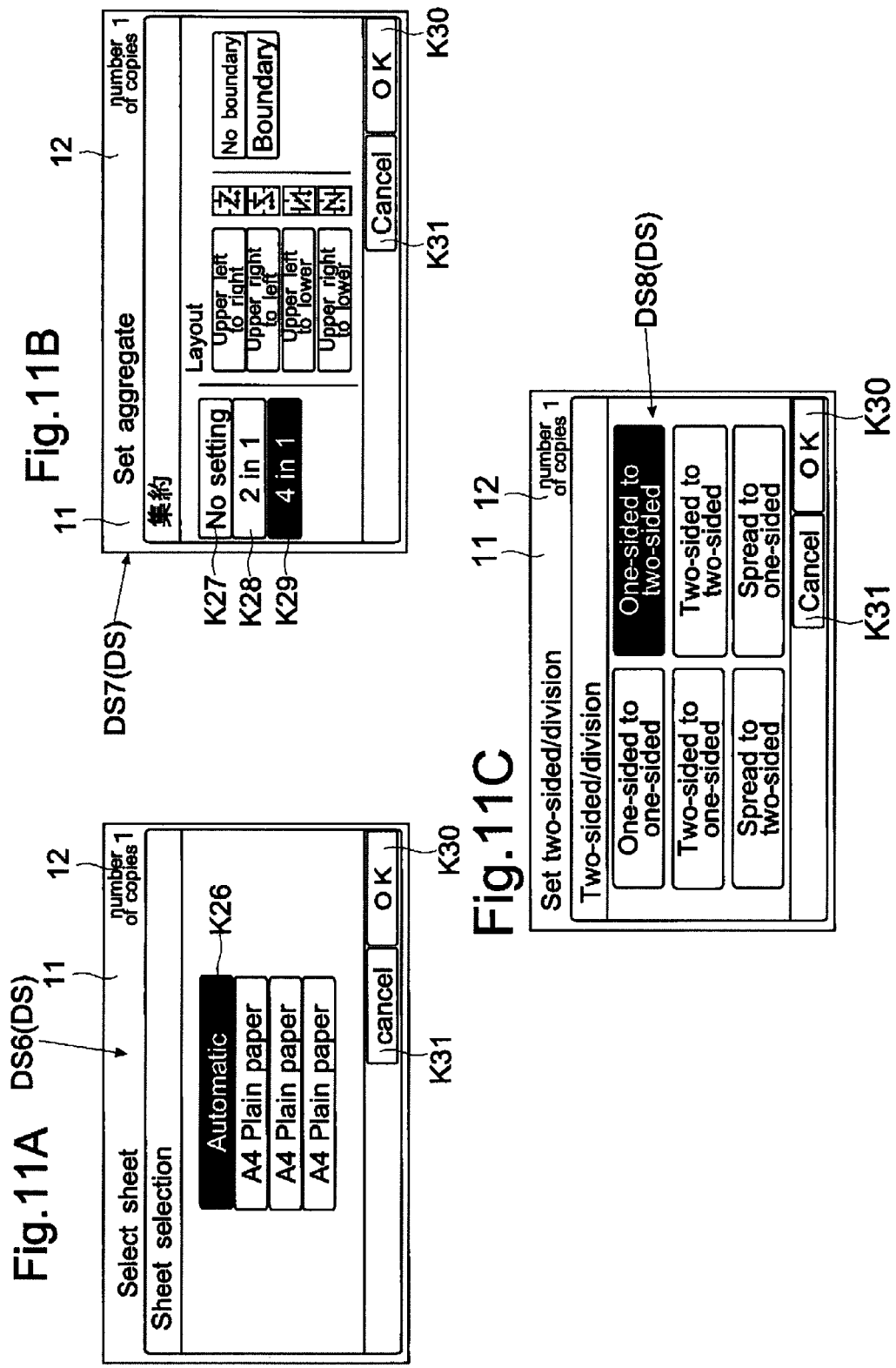

(b)

DISPLAY INPUT DEVICE, IMAGE FORMING APPARATUS, AND DISPLAY METHOD OF THE DISPLAY INPUT DEVICE

This application is based upon and claims the benefit of priority from the corresponding Japanese Patent Application No. 2010-034846 filed on Feb. 19, 2010, the entire contents of which are incorporated herein by reference.

BACKGROUND OF THE INVENTION

1. Field of the Invention

The present invention relates to a display input device including a display unit and an input unit such as a touch panel, and also relates to an image forming apparatus equipped with the same, such as a copier, a multifunction peripheral, a printer, or a fax machine.

2. Description of Related Art

For instance, an image forming apparatus such as a copier or a multifunction peripheral is equipped with many functions (e.g., scaling, aggregate print, two-sided print, and the like). The image forming apparatus may be equipped with a display input device having a screen with a liquid crystal display unit and a touch panel, for example, so that a function to be set can be easily selected and set among the many functions. In addition, a plurality of functions that are often used and set values thereof may be registered as a program, so that the setting can be performed easily. The user can set many functions by one touch of the key for calling the program.

For instance, there is known an image forming apparatus equipped with a copy mode input set unit for inputting various copy modes such as a sheet size, so as to be a multimode type that can perform copy operation by the input and set copy mode, a copy mode call/register unit having two functions of copy mode call and registration set by the copy mode input set unit, and a control unit that switches program call and registration in accordance with a state of the image forming apparatus. Thus, it is possible to perform copy mode call and registration by one key operation.

In general, the display input device displays many set items for setting functions. The user selects one or more set items and sets the set value. Then, as described above, some known image forming apparatuses can register the setting performed for copying as a program. However, the user may want to change the registered contents of the program little or largely for performing a process. In this case, the user has to perform usual selection of set items and setting of set values. In addition, it is difficult for other person than the user who registered the program to know which set items have been selected and which set values have been set. In this way, the conventional method has a problem in usability after calling the program.

In addition, after calling the program, addition of set items, deletion of the same, and change of a set value in a set item can be usually performed without limitation. Therefore, after calling the program, selection cancellation of a set item, change of a determined set value, additional selection of an unnecessary set item, and the like may be performed. However, the operation of changing registered contents of the program may be what is undesired (unexpected) by the person who registered (created) the program. In other words, there is a problem that an operation mistake for the person who registered the program may be performed.

For instance, in order to prevent waste of resources, it may be obliged to use an aggregate function (in which each page is scaled down so that a plurality of pages of document are included in one page). In this case, an operation mistake of removing the aggregate may occur. In addition, in order to prevent transmission mistake, in data transmission such as FAX or the like, even if a transmission destination is fixed, an operation mistake of changing a transmission destination fixed as a set value may occur.

SUMMARY OF THE INVENTION

An object of the present invention is, in view of the above-mentioned problem in the conventional technique, to make it possible to set also detail points (display or not display of a set item, enable or disable of changing a set value, and the like) as the program when the program is registered. It is also an object to support needs of users in the program registration in more detail and more appropriately so as to prevent occurrence of an operation mistake when the program is called.

In order to achieve the object described above, a display input device according to an aspect of the present invention includes a display unit which displays a plurality of types of executable functions as set items, a storage unit which stores a program for controlling the display unit to display a screen that is a combination of set items selected from a plurality of set items and registered in advance and is called for setting a set item selected and registered in advance, and stores information about whether or not to display a set item included in the program when the program is called as contents of the program; an input unit which accepts an input for selecting a set item to be included in the program when the program is created and registered, and accepts an input about whether or not to display a set item to be included in the program when the program is called; and a display control unit which controls displays on the display unit, and recognizes an input performed by the input unit, so as to control the display unit not to display a set item that is determined to be no display when the program is called.

By using the present invention, it is possible to create and register a program that can support user needs more precisely and appropriately. In addition, when the program is called, it is possible to determine set items and set values that are set in advance. Therefore, it is possible to prevent a user's operation mistake of the program that is unexpected by a creator (registrant) of the program.

Further features and advantages of the present invention will become apparent from the description of embodiments given below.

BRIEF DESCRIPTION OF THE DRAWINGS

FIGS. 11A to 11C are explanatory diagrams illustrating an example of a set value setting screen in creating a workflow about copying.

DETAILED DESCRIPTION OF THE PREFERRED EMBODIMENTS

Hereinafter, an embodiment of the present invention will be described with reference to FIGS. 1 to 21. Here, the present invention can be applied to various display input device, but an operation panel 1 (corresponding to display input device) will be exemplified and described. In addition, a case where the operation panel 1 is attached to a multifunction peripheral 100 (corresponding to the image forming apparatus) will be exemplified and described. However, the elements of structures, locations and the like described in this embodiment do not restrict the scope of the invention and are merely examples for description.

(Outline of Image Forming Apparatus)

Figure 1:
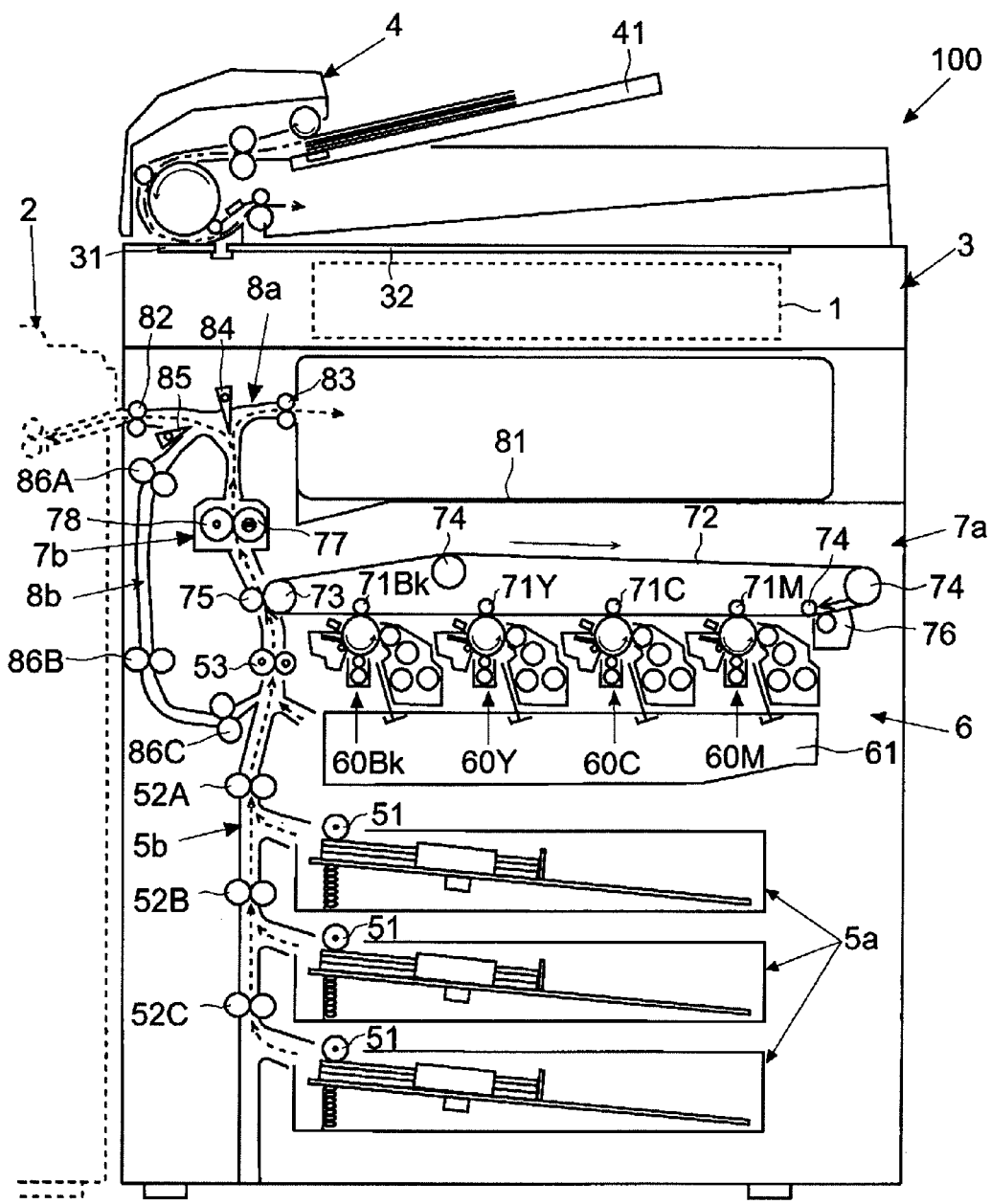
FIG. 1 is a front schematic cross sectional view illustrating an example of a multifunction peripheral.
Figure 2:
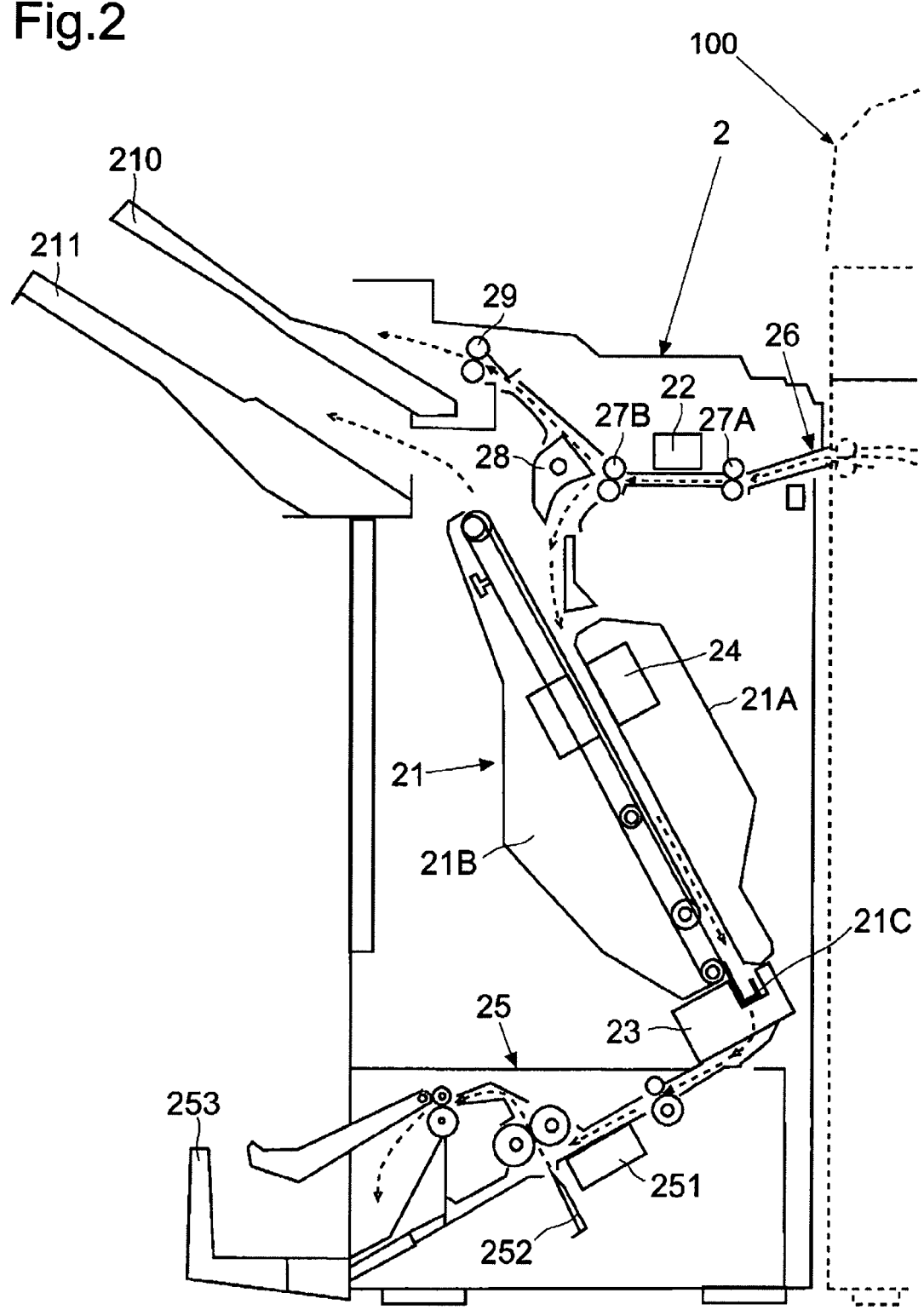
FIG. 2 is a front schematic cross sectional view illustrating an example of a post-processing device.

First, with reference to FIGS. 1 and 2, an outline of the multifunction peripheral 100 according to the embodiment of the present invention will be described. FIG. 1 is a front schematic cross sectional view illustrating an example of the multifunction peripheral 100 according to the embodiment of the present invention. FIG. 2 is a front schematic cross sectional view illustrating an example of a post-processing device according to the embodiment of the present invention.

As illustrated in FIG. 2, the multifunction peripheral 100 (corresponding to the image forming apparatus) of this embodiment includes a post-processing device 2 as an optional device attached to left side thereof. The post-processing device 2 takes in sheets after being printed by the multifunction peripheral 100, and performs various processing such as a stapling process. In addition, the operation panel 1 to perform various setting for the multifunction peripheral 100 is provided to the front of the multifunction peripheral 100 (which will be described later in detail).

As illustrated in FIG. 1, an image reader unit 3 and a document feeding device 4 are provided to the upper part of the multifunction peripheral 100 according to this embodiment. The multifunction peripheral 100 includes a paper sheet feeder 5a, a transport path 5b, an image forming unit 6, an intermediate transferring unit 7a, a fixing unit 7b, a delivery conveyor unit 8a, a two-sided transport path 8b, and the like inside a main body.

The document feeding device 4 includes a document tray 41 on which a document to be read is placed. Then, the document feeding device 4 feeds the document from the document tray 41 to a read position (contact glass for feed reading 31) one by one sheet automatically and successively. In addition, the document feeding device 4 is attached to the image reader unit 3 in an openable and closable manner in the up and down direction about rear side of the paper in FIG. 1. The document feeding device 4 works as a cover that presses down contact glasses of the image reader unit 3 (contact glass for feed reading 31 and contact glass for place reading 32) from upside.

Next, as illustrated in FIG. 1, the contact glass for feed reading 31 and the contact glass for place reading 32 on which a document such as a book is placed when reading the document one by one sheet are disposed on the upper surface of the image reader unit 3. A lamp, a mirror, a lens, an image sensor, and the like (not shown) are disposed in the image reader unit 3. The image sensor reads the document passing on the contact glass for feed reading 31 or the document placed on the contact glass for place reading 32 on the basis of reflection light from the document. Then, the image sensor converts the reflection light into an analog electric signal corresponding to image density. After that, quantization is performed so as to obtain image data of the document. Note that the image reader unit 3 of this embodiment can read in color or monochrome.

A plurality of paper sheet feeders 5a in the main body of the multifunction peripheral 100 store respective sizes (e.g., A-type such as A4 and B-type such as B4) of various paper sheets (e.g., copy paper, recycled paper, cardboard, OHP sheets, and the like). Each of the paper sheet feeders 5a has a paper feed roller 51 that is driven to rotate. The paper sheet feeder 5a feeds paper sheets one by one to the transport path 5b when printing is performed.

The transport path 5b is a path for conveying paper sheets from the paper sheet feeder 5a to the image forming unit 6 in the apparatus. Further, guide plates for guiding paper sheets, transport roller pairs 52 (three pairs 52A, 52B and 52C from upper side in FIG. 3) that are driven to rotate when paper sheets are conveyed, and a resist roller pair 53 that holds the conveyed paper sheet to wait before the image forming unit 6 and feeds out the same in synchronization with transfer timing of a formed toner image are disposed in the transport path 5b.

The image forming unit 6 includes a plurality of image forming units 60 (60Bk for black color, 60Y for yellow color, 60C for cyan color, and 60M for magenta color), and an exposure device 61. The exposure device 61 outputs a laser beam while turning on and off the same on the basis of image data read by the image reader unit 3 or image data stored in a storage device 92 that will be described later, so as to scan and expose each of photosensitive drum.

Each of the image forming units 60 includes the photosensitive drum supported in a rotatable manner, and an electrifying device, a developing device, a cleaning device, and the like that are disposed around the photosensitive drum. Then, each of the image forming units 60 and the exposure device 61 form a toner image on the circumferential surface of the photosensitive drum.

The intermediate transferring unit 7a receives a primary-transferred toner image from each of the image forming units 60 and performs secondary transferring. The intermediate transferring unit 7a includes primary transferring rollers 71Bk to 71M, an intermediate transferring belt 72, a drive roller 73, a plurality of idler rollers 74, a secondary transferring roller 75, a belt cleaning device 76, and the like. An endless intermediate transferring belt 72 is sandwiched between each of the primary transferring rollers 71Bk to 71M and the corresponding photosensitive drum. A transferring voltage is applied to each of the primary transferring rollers 71Bk to 71M, so that the toner image is transferred to the intermediate transferring belt 72.

The intermediate transferring belt 72 is wound and stretched around the drive roller 73 and the like, and is driven to turn by rotation of the drive roller 73 that is connected to a drive mechanism such as a motor (not shown). In addition, the drive roller 73 and the secondary transferring roller 75 sandwich the intermediate transferring belt 72. The toner images (of black, yellow, cyan, magenta colors) formed in the individual image forming units 60 are sequentially superposed precisely so as to be transferred onto the intermediate transferring belt 72 as primary transferring, and then the toner image is transferred onto a sheet by the secondary transferring roller 75 to which a predetermined voltage is applied.

The fixing unit 7b fixes the toner image that is transferred onto the paper sheet. The fixing unit 7b is mainly constituted of a heating roller 77 in which a heating element is embedded, and a press roller 78 that presses the heating roller 77. Then, when the paper sheet passes through a nip between the heating roller 77 and the press roller 78, the toner is melted and heated. As a result, the toner image is fixed onto the paper sheet. The paper sheet delivered from the fixing unit 7b is conveyed to a delivery tray 81 or the post-processing device 2.

The delivery conveyor unit 8a sorts printed paper sheets into paper sheet conveying directions of the post-processing device 2, the delivery tray 81, and the two-sided transport path 8b. Further, the delivery conveyor unit 8a includes a delivery roller pair 82 that delivers the paper sheet to the post-processing device 2, and a delivery roller pair 83 that delivers the paper sheet to the delivery tray 81 or reverses to perform switchback for two-sided print. The delivery roller pairs 82 and 83 are driven to rotate. In addition, the delivery conveyor unit 8a includes two switch valves 84 and 85, for example, so as to switch conveying directions of the paper sheet. Each of the switch valves 84 and 85 swings to lead the paper to the delivery destination specified by the operation panel 1 or the like or to lead the paper sheet one side of which is printed to the two-sided transport path 8b when the two-sided print is performed.

The two-sided transport path 8b connects the downstream side of the fixing unit 7b with the upstream side of the resist roller pair 53. In order to convey the paper sheet one side of which is printed for the two-sided print, a plurality of two-sided transport roller pairs 86 (three pairs 86A, 86B and 86C) that are driven to rotate are disposed in the two-sided transport path 8b.

On the other hand, as illustrated in FIG. 2, the post-processing device 2 is provided with a stack unit 21 which temporarily stores a bunch of paper sheets, a punch unit 22 which performs a punching process, a staple unit 23 which performs a stapling process on the bunch of paper sheets in the stack unit 21 (stapling the leading end side of the paper sheets viewed from the stack direction), a staple unit 24 (stapling the trailing end side of the paper sheets), a folding unit 25, and the like. The stack unit 21 performs a process of stacking a plurality of paper sheets to be a bunch. The folding unit 25 includes a saddle staple unit 251. The saddle staple unit 251 folds the bunch of paper sheets that is saddle-stapled at the center thereof along the staples.

Specifically, processes in the post-processing device 2 will be described. First, the printed paper sheet delivered from the multifunction peripheral 100 to the post-processing device 2 passes through an inlet 26 disposed on a side surface of the post-processing device 2 and is conveyed to the inside of the post-processing device 2. In addition, the punch unit 22 is disposed on the downstream of the inlet 26. The punch unit 22 performs the punching process on the paper sheet. Further, transport roller pairs 27A and 27B which is driven to rotate for conveying the paper sheet, and a guide nail 28 which swings in accordance with destinations of the paper sheet are disposed on the downstream of the punch unit 22.

When selection of performing the stapling process or the like is made by an input to the operation panel 1 or the like, the guide nail 28 swings so as to send the paper sheet to the stack unit 21 below the guide nail 28. As a result, the paper sheet is conveyed to the stack unit 21. Further, when the folding process is performed, the paper sheets after being stacked in the stack unit 21 are conveyed to the folding unit 25 that is disposed further below.

On the other hand, when selection of performing the punching process or the stapling process is not made (i.e., when the post-processing device 2 does not perform any process), or when the delivery destination is set to a sub delivery tray 210 by the operation panel 1, the guide nail 28 swings so as to send the paper sheet to a delivery roller pair 29 above the guide nail 28, for example. As a result, the paper sheet is delivered to the sub delivery tray 210 from the delivery roller pair 29.

The stack unit 21 is constituted of a cover tray 21A and a stack tray 21B. Then, the conveyed paper sheet is sent to the space between the cover tray 21A and the stack tray 21B. The paper sheets are stacked on the upper surface of the stack tray 21B. The cover tray 21A works as a cover pressing the bunch of paper sheets from above. The stack tray 21B has a stopper 21C that receives the conveyed paper sheet. The stopper 21C moves up and down so as to convey the stacked bunch of paper sheets upward or downward.

Further, there is provided the staple unit 23 that staples the leading end side of the paper sheets (lower side of the stacked paper sheets) and the staple unit 24 that staples the trailing end side of the paper sheets (upper side of the stacked paper sheet) accompanying the stack unit 21. The staple units 23 and 24 performs so-called oblique staple in which one of leading corners of the bunch of paper sheets is stapled with a staple slanted at 45 degrees. Then, the stack unit 21 conveys the bunch of paper sheets after the stapling process or the like upward and delivers the same to a main delivery tray 211.

The folding unit 25 is disposed below the stack unit 21. When the folding process is selected by input to the operation panel 1 or the like, the bunch of paper sheets that is once stacked in the stack unit 21 is conveyed toward the folding unit 25. The saddle staple unit 251 can perform center stapling, in which the bunch of paper sheets are stapled with two staples, for example, along the short side direction at the center of the longitudinal direction. The center stapled bunch of paper sheets is folded by a protruding rod 252 of the folding unit 25 and is delivered to a booklet tray 253.

(Operation Panel 1)

Figure 3:
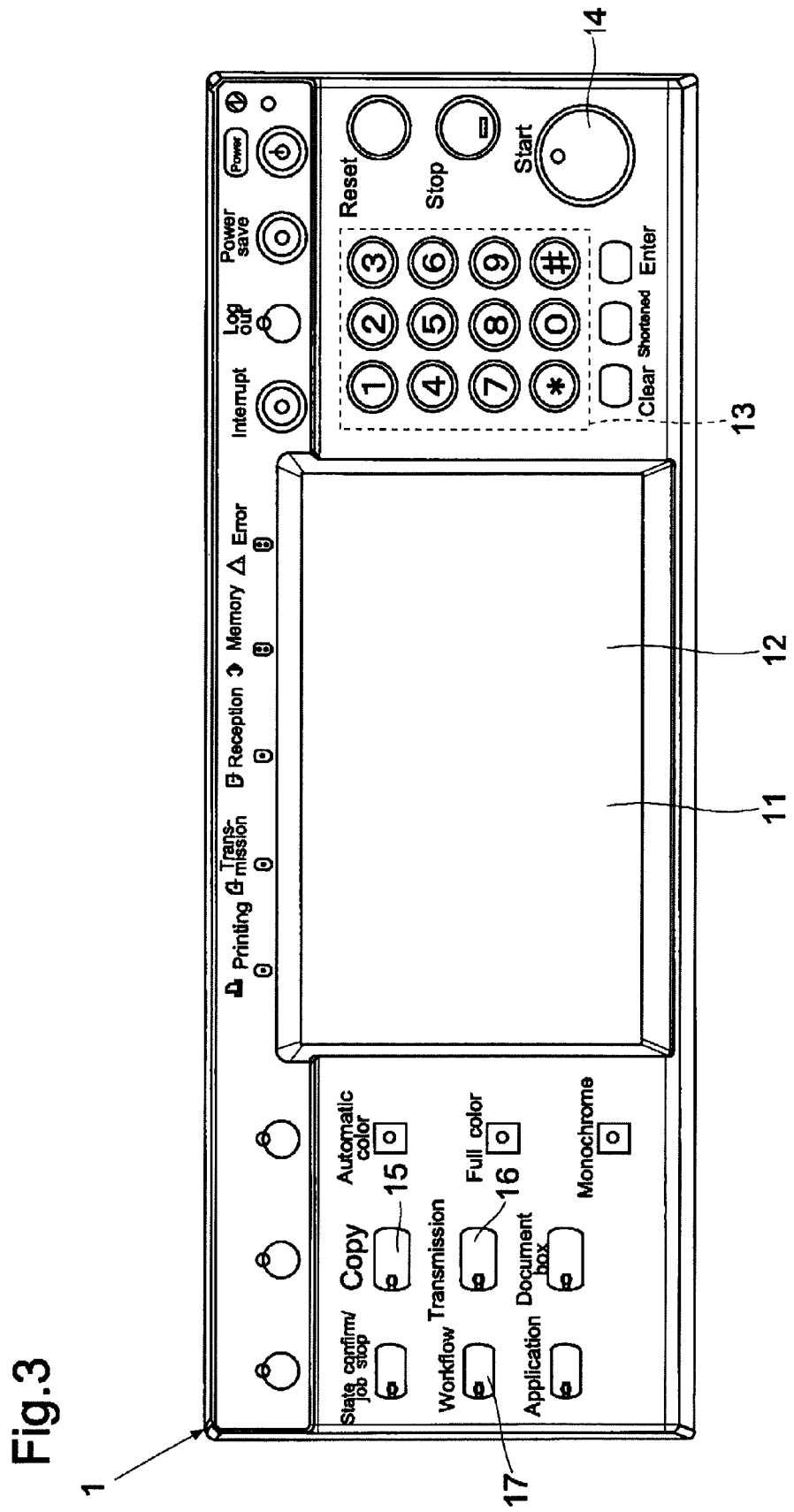
FIG. 3 is a plan view illustrating an example of an operation panel.

Next, with reference to FIG. 3, an example of the operation panel 1 according to the embodiment of the present invention will be described. FIG. 3 is a plan view illustrating an example of the operation panel 1 according to the embodiment of the present invention.

The operation panel 1 is disposed at the upper part of the front surface of the multifunction peripheral 100 as illustrated in FIGS. 1 and 3. Further, the operation panel 1 includes a liquid crystal display unit 11 (corresponding to the display unit) that displays menus and keys (see FIG. 5 and others) for setting or instructing operations for the multifunction peripheral 100 and the post-processing device 2, and various images and screens of status messages and the like of the multifunction peripheral 100 and the like. A user presses a key displayed on the liquid crystal display unit 11 so as to perform various setting for the multifunction peripheral 100 and setting or instructing operations for the post-processing device 2. For instance, the user can instruct the post-processing device 2 to perform the stapling process or can set and input the delivery destination of paper sheets.

In addition, a touch panel unit 12 (corresponding to the input unit) is disposed on the upper surface of the liquid crystal display unit 11. The touch panel unit 12 detects the position or coordinates of the point where the user presses on the liquid crystal display unit 11. The coordinates detected by the touch panel unit 12 are compared with the position or coordinates of various keys displayed on the liquid crystal display unit 11, so that the key pressed and selected by the user is specified. Note that the touch panel unit 12 may utilize various types such as a resistor film type, a surface acoustic wave type, an infrared type, a capacitance type, and the like without specific limitation.

In addition, the operation panel 1 includes following hardware keys (buttons). For instance, there are a ten-key unit 13 (corresponding to the input unit) for numeric input, a start key 14 (corresponding to the input unit) for instructing to start a process such as copying after various setting, and the like. In addition, a copy key 15 (corresponding to the input unit) that is pressed when a copy function is used, a transmission key 16 (corresponding to the input unit) that is pressed when a scanner function or a fax function is used, and the like are disposed. In addition, a workflow key 17 (corresponding to the input unit) is also disposed, which is pressed when a workflow is created, registered or called (details will be described later). In this way, the touch panel unit 12 and the various hardware keys are disposed on the operation panel 1 so as to work as an input unit for performing various setting and mode selection with respect to each function of the multifunction peripheral 100.

(Hardware Structure of Multifunction Peripheral 100 Etc.)

Figure 4:
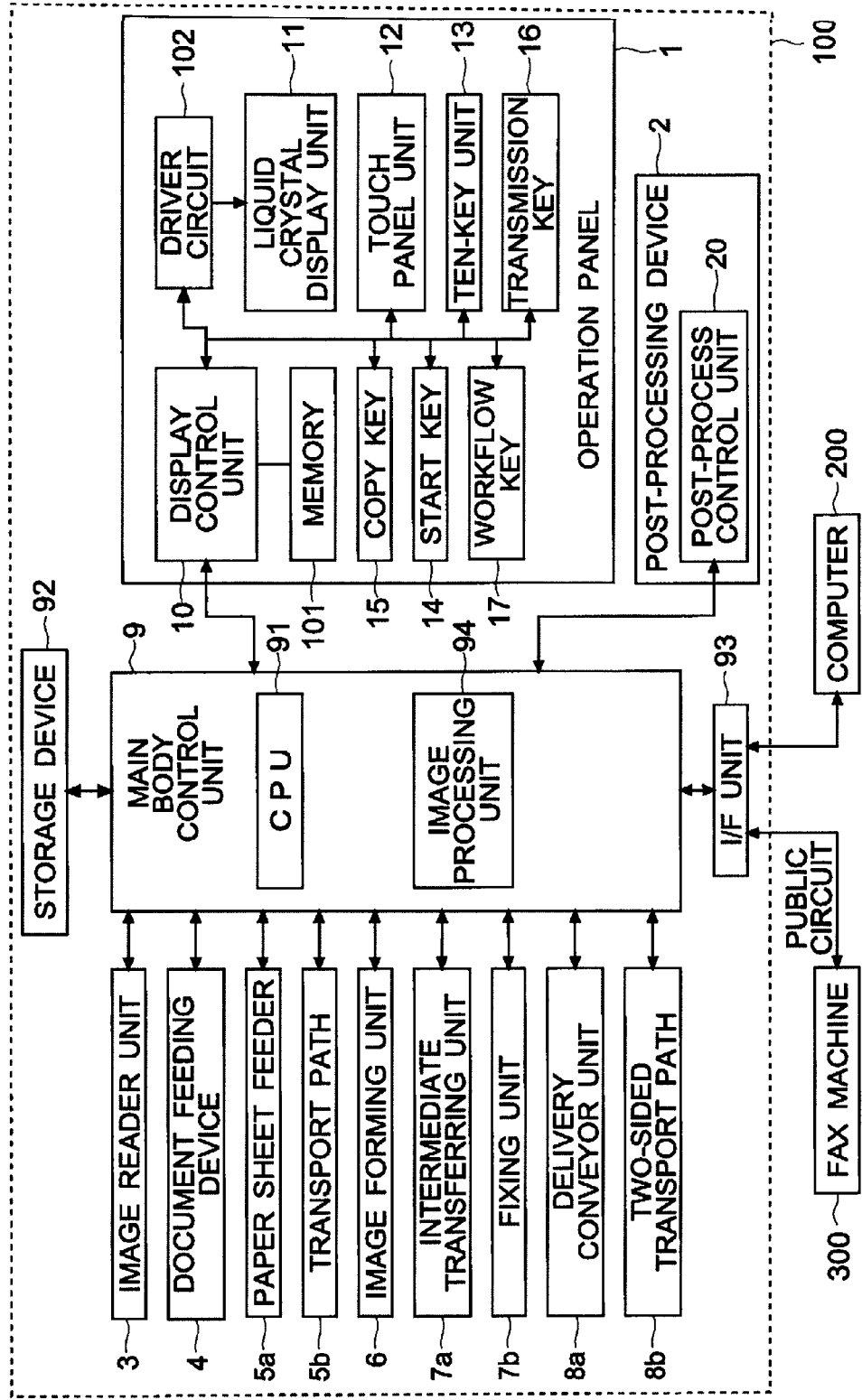
FIG. 4 is a block diagram illustrating an example of a hardware structure of a multifunction peripheral.

Next, with reference to FIG. 4, an example of a hardware structure of the multifunction peripheral 100 or the like according to the embodiment of the present invention will be described. FIG. 4 is a block diagram illustrating an example of the hardware structure of the multifunction peripheral 100 or the like according to the embodiment of the present invention.

First, a main body of the multifunction peripheral 100 will be described. A main body control unit 9 is disposed inside the main body of the multifunction peripheral 100. The main body control unit 9 is connected to the operation panel 1, the document feeding device 4, the image reader unit 3, the paper sheet feeder 5a, the transport path 5b, the image forming unit 6, the fixing unit 7b, the delivery conveyor unit 8a, and the like, for example, so as to control these units.

The main body control unit 9 includes, for example, an element such as a CPU 91. The CPU 91 performs operations and the like on the basis of a control program that is stored in the storage device 92 (corresponding to the storage unit) and is loaded, so as to control individual units of the multifunction peripheral 100. Note that the main body control unit 9 may be split into units for individual functions (plurality of types), including a main control unit that performs general control and image processing, and an engine control unit that controls image formation and printing by turns on and off a motor and the like for driving various rotation bodies. In this description, a case where these control units are integrated as the main body control unit 9 are shown and described.

The storage device 92 is connected to the main body control unit 9. The storage device 92 is constituted as a combination of a nonvolatile storage device and a volatile storage device, which includes a ROM, a RAM, an HDD, and the like. The storage device 92 can store a control program and various data such as control data, set data, image data, and the like, for the multifunction peripheral 100. In addition, particularly, concerning the present invention, the storage device 92 can store a created workflow (corresponding to the program). Note that the workflow means a combination of registered set items after being selected from a plurality of set items in advance, and it is a program that is called for displaying a screen for setting the set items that are selected and registered in advance, on the display unit (details will be described later).

Figure 7:
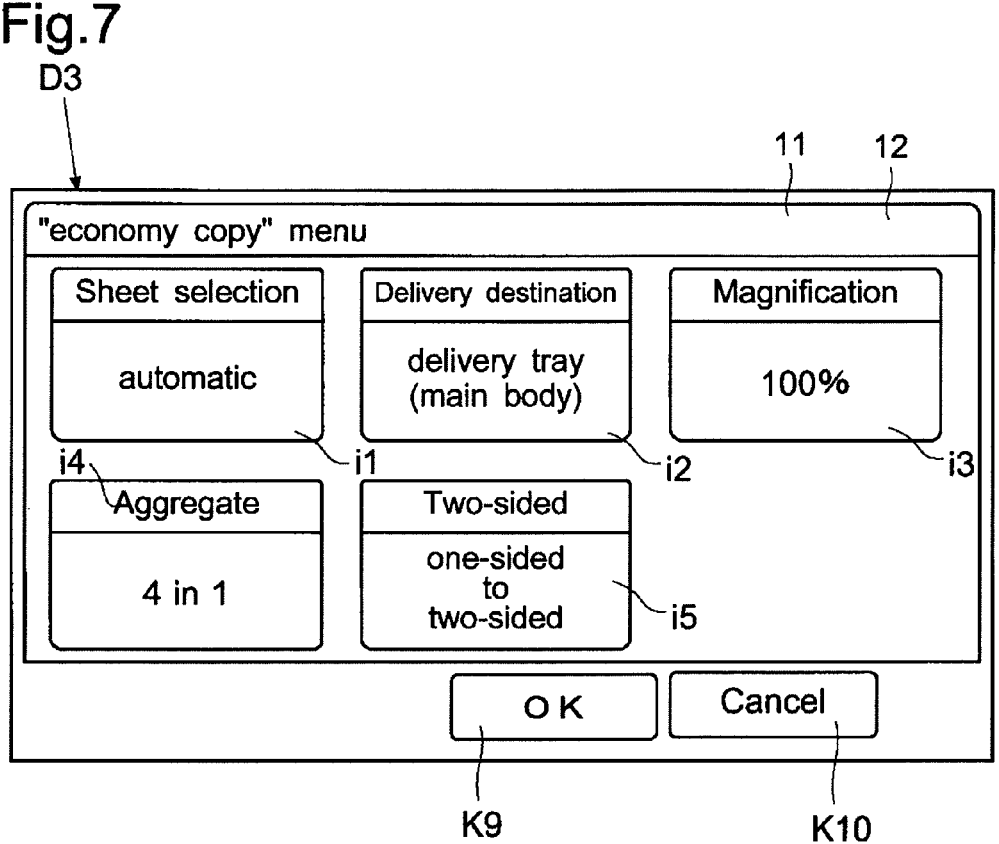
FIG. 7 is an explanatory diagram illustrating an example of a menu screen when a workflow is displayed in a menu format.

Further, the main body control unit 9 is connected to an interface unit (hereinafter referred to as I/F unit 93) having various connectors, sockets, a fax modem, and the like. The I/F unit 93 is connected to a plurality of external computers 200 (e.g., personal computers) and a fax machine 300 on the other side via a network, a public line, or the like (each one of them is illustrated in FIG. 7 for convenience sake). For instance, image data obtained by the image reader unit 3 can be stored in the storage device 92, or can be transmitted to the external computer 200 or the fax machine 300 on the other side (scanner function, fax function). In addition, it is also possible to perform printing, fax transmission, or the like on the basis of the image data received from the external computer 200 or the fax machine 300 on the other side and input to the multifunction peripheral 100 (printer function or fax function).

In addition, the main body control unit 9 recognizes inputs from the operation panel 1 and controls the multifunction peripheral 100 so that the copy or the like is performed in accordance with setting by the user. When setting for performing stapling with the post-processing device 2 or setting for delivering to the sub delivery tray 210 is made on the operation panel 1, for example, the main body control unit 9 controls the delivery conveyor unit 8a so that a printed paper sheet is conveyed to the post-processing device 2, and controls the switch valves 84 and 85 to swing. In addition, when the setting for delivering to the delivery tray 81 in the body of the multifunction peripheral 100 is made on the operation panel 1, for example, the main body control unit 9 controls the delivery conveyor unit 8a so that a printed paper sheet is conveyed to the delivery tray 81 in the body, and controls the switch valves 84 and 85 to swing.

In addition, for example, the main body control unit 9 includes an image processing unit 94 that performs image processing on image data obtained by reading a document by the image reader unit 3 or image data input to the multifunction peripheral 100 via the I/F unit 93. The image data processed by the image processing unit 94 is, for example, transmitted to the exposure device 61 and is used for scanning and exposing the photosensitive drum.

In addition, the main body control unit 9 is connected to a post-process control unit 20 that is disposed inside the post-processing device 2 and controls operation of the post-processing device 2, so that communication between them can be performed. For instance, the post-process control unit 20 controls operations of the punch unit 22, the staple units 23 and 24, and the like on the basis of instruction from the main body control unit 9. For instance, the post-process control unit 20 controls rotation of the motor that drives the guide nail 28 to swing. Further, in accordance with an instruction from the main body control unit 9 (e.g., to deliver to the sub delivery tray 210 or the main delivery tray 211, or to convey to the stack unit 21 for the punching process), the post-process control unit 20 controls a motor in the post-processing device 2 to rotate forward or reverse, so as to control a conveying direction of a paper sheet.

The operation panel 1 according to this embodiment includes a display control unit 10, a memory 101 (corresponding to the storage unit), a driver circuit 102, the liquid crystal display unit 11, and the touch panel unit 12. The display control unit 10 is constituted of a CPU, IC, or the like, so as to control the display of the liquid crystal display unit. In addition, the display control unit 10 receives an output of the touch panel unit 12 and specifies coordinates of a pressed position on the liquid crystal display unit 11. The data such as a table indicating correspondence between the output of the touch panel unit 12 and the coordinates is stored in the memory 101. The display control unit 10 compares the coordinates of the pressed position with image data on each setting screen DS so as to specify and recognize a key that is selected (pressed) on the setting screen DS.

Specifically, in order to select a set item of each function of the multifunction peripheral 100 and set a set value, setting of keys displayed on the liquid crystal display unit 11 is repeated from a top layer display of the liquid crystal display unit 11. Then, the display control unit 10 controls the liquid crystal display unit 11 to change its display for each key selection so as to set finally a set value of the function to be selected and set. The display control unit 10 recognizes that the function is selected and the set value is set, and transmits the contents thereof to the main body control unit 9 of the main body. Thus, the main body control unit 9 controls the individual units of the image forming unit 6 or the like to perform an operation in accordance with the function selected and set by the operation panel 1. Thus, user's intention is reflected on the printing or the like (e.g., set density, scaling, or the like).

Further, the image data of screens and images displayed on the liquid crystal display unit 11 are stored, for example, in the memory 101 in the operation panel 1. Therefore, every time when a key in a selection screen DF of a set item or each setting screen DS is pressed, the display control unit 10 reads out image data of the screen to be displayed next from the memory 101.

In addition, the image data of screens and images displayed on the liquid crystal display unit 11 may be stored in the storage device 92 of the main body, for example. In this case, the operation panel 1 receives the image data for displaying on the liquid crystal display unit 11 from the storage device 92 via the main body control unit 9. When receiving the image data, the display control unit 10 instructs the driver circuit 102 that actually controls the display on the liquid crystal screen. Note that it is possible to dispose only the driver circuit 102, the liquid crystal display unit 11, and the touch panel unit 12 in the operation panel 1, so that the structure of the main body control unit 9 (CPU 91 or storage device 92) controls the operation panel.

(Call and Use of Workflow)

Figure 5:
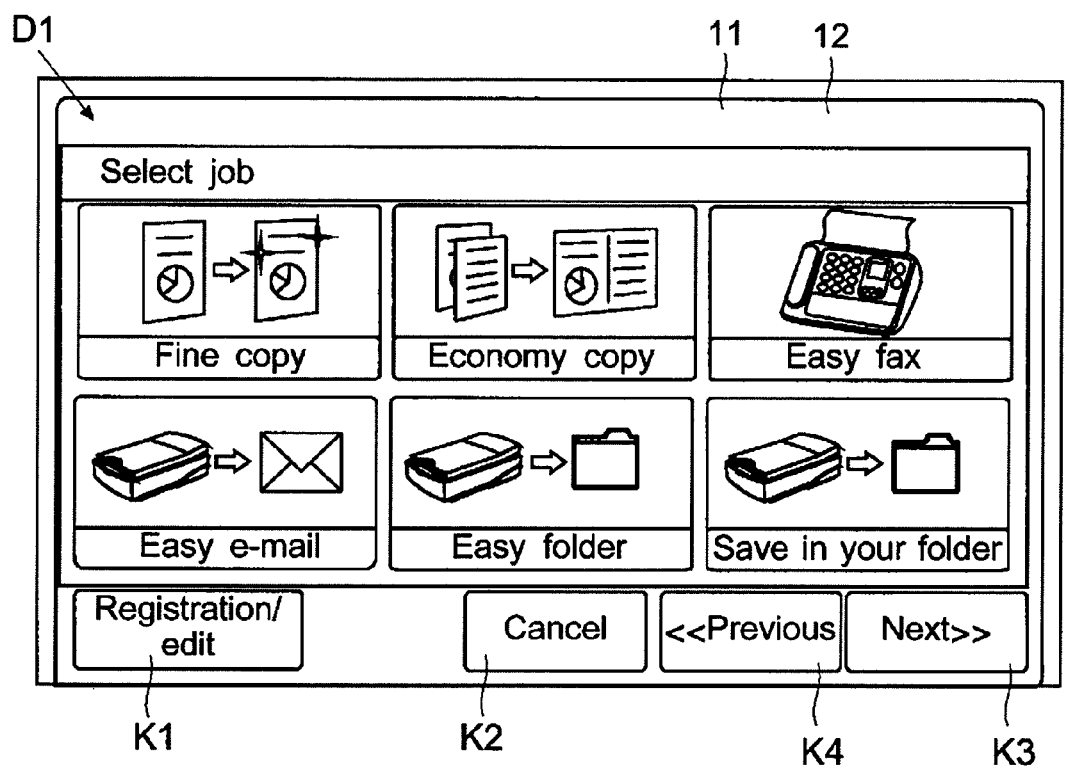
FIG. 5 is an explanatory diagram illustrating an example of a call screen when a workflow is selected.
Figure 6:
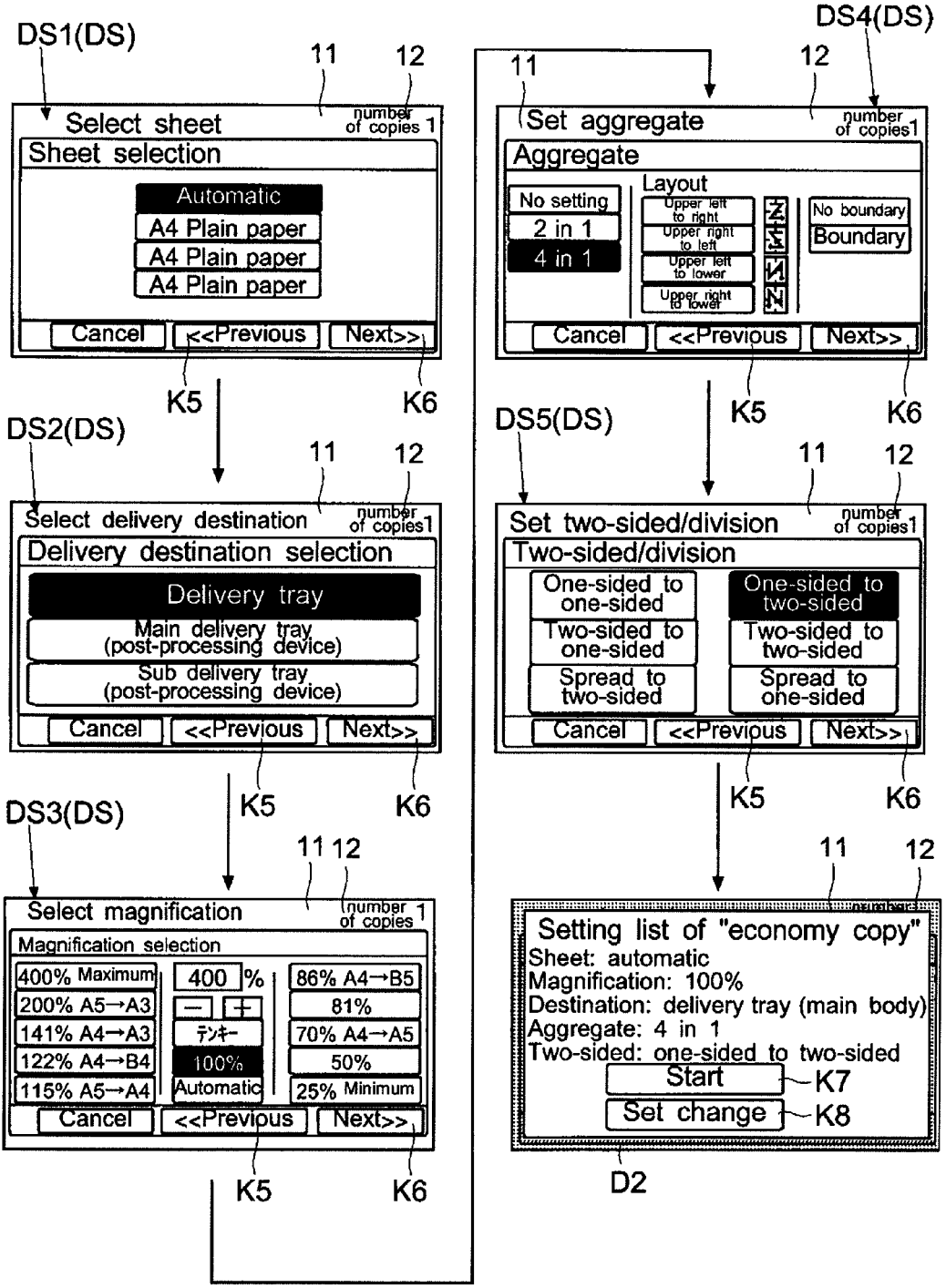
FIG. 6 is an explanatory diagram illustrating an example of a process flow when a workflow is displayed in a wizard format.

Next, with reference to FIGS. 5 to 7, an example of an outline of workflow, call and use of the workflow according to the embodiment of the present invention will be described. FIG. 5 is an explanatory diagram illustrating an example of a call screen D1 when a workflow according to the embodiment of the present invention is elected. FIG. 6 is an explanatory diagram illustrating an example of a process flow when a workflow is displayed in a wizard format. FIG. 7 is an explanatory diagram illustrating an example of a menu screen D3 when a workflow is displayed in a menu format.

The multifunction peripheral 100 of this embodiment has many functions that can be set and many set items. Further, the liquid crystal display unit 11 displays a selection screen DF for selecting a set item to be set from a plurality of set items, and the user selects (presses) a set item (function) that is used in printing or transmission. For instance, the liquid crystal display unit 11 displays each set item as a key. In addition, a liquid crystal display unit 11 displays each setting screen DS for the selected set item. The user can perform selection and setting of various functions by pressing a key displayed on each setting screen DS, a hardware key disposed around the liquid crystal display unit 11, and the like.

The user sets a set value in each set item by input on the setting screen DS of each set item displayed on the liquid crystal display unit 11. Here, there are set items that are often combined when the user uses the multifunction peripheral 100. For instance, to reduce consumption of the paper sheet, aggregate and two-sided print are combined in setting, or a method of transmitting image data obtained by reading with the image reader unit 3 and a specific destination of transmission are combined. However, as described above, the multifunction peripheral 100 has many set items (functions) so that it is bothering and inconvenient to set in the same manner every time when using the multifunction peripheral 100.

Therefore, in the multifunction peripheral 100 of this embodiment, a combination of set items that is often used can be selected and created in advance, so that the combination of the set items is stored (registered) as the workflow in the storage unit (storage device 92, memory 101 or the like) (details will be described later). Then, the user calls a workflow stored in the storage device 92 (program including data including set items selected in advance, a display order thereof, and a display format thereof), so that screens for setting the set items that are selected in advance are displayed on the liquid crystal display unit 11.

For instance, when calling a workflow that is registered in advance, the user presses the workflow key 17 (see FIG. 3). Then, as illustrated in FIG. 5, the call screen D1 for selecting a workflow to be used (called) among the workflows registered in advance is displayed on the liquid crystal display unit 11. For instance, FIG. 5 illustrates an example where images indicating workflows named "fine copy", "economy copy", "easy fax", "easy e-mail", "easy folder", and "save in your folder" are displayed. Then, when the image indicating each workflow is pressed, the pressed workflow is called from the storage device 92 or the memory 101, so that the liquid crystal display unit 11 displays a screen for setting by the workflow.

In addition, below the call screen D1, there is disposed a registration/edit key K1 that is pressed when creating a new workflow or when editing a registered workflow. In addition, a cancel key K2 to stop calling the workflow is also disposed. In addition, as illustrated in FIG. 5, there is a limitation of workflows that can be displayed in one screen. Therefore, when a next key K3 is pressed, the display is changed to the call screen D1 of the next page, and an image indicating a workflow that is different from that illustrated in FIG. 5 is displayed. In addition, when a previous key K4 is pressed, the call screen D1 of the previous page is displayed.

Next, a display and setting when the workflow is called will be described. Note that there are prepared display formats as screens for setting when the workflow is called, which include a wizard display format, a menu display format, and a list display format. Which display format is used for a display can be set when the workflow is registered, for example. Therefore, an outline when the workflow is called will be described for each display format.

[Wizard Display Format]

First, with reference to FIG. 6, the wizard display format in the workflow will be described. For instance, FIG. 6 illustrates an example of the workflow in the wizard format when the "economy copy" workflow illustrated in FIG. 5 is called.

The workflow of "economy copy" illustrated in FIG. 6 is created and registered so that the set screens DS of the individual set items are displayed in the order of a setting screen DS1 of the "sheet selection", a setting screen DS2 of the "delivery destination selection", a setting screen DS3 of the "magnification", a setting screen DS4 the "aggregate", and a setting screen DS5 of the "two-sided/division". Note that the black line with arrow in FIG. 6 indicates a display order.

A previous key K5 and a next key K6 are disposed in each setting screen DS. When the previous key K5 is pressed, the liquid crystal display unit 11 displays the setting screen DS of the previous set item. In addition, when the next key K6 is pressed, the liquid crystal display unit 11 displays the setting screen DS of the next set item. The user can set a set value in each set item by pressing a key for setting disposed in each setting screen DS. For instance, as illustrated in FIG. 6, the pressed key for setting is reversed in black and white (displayed in white characters in black background).

Further, when the workflow is created and registered, a default value of the set value in the workflow can be determined in advance for displaying each setting screen DS. This default value is stored as a part of the workflow in the storage device 92. For instance, when the workflow is created so that "4 in 1" is the default value for aggregate, as illustrated in FIG. 6, a 4 in 1 key K29 is displayed in a selected state on the liquid crystal display unit 11 as the display is switched from the setting screen DS3 of "magnification" to the setting screen DS4 of "aggregate" first time.

Then, when all setting of five set items registered in advance as the workflow of "economy copy" are finished and the next key K6 is pressed in the setting screen DS5 of "two-sided/division", the liquid crystal display unit 11 displays a setting list D2. The set items included in the workflow and the set values in each set item are displayed in the setting list D2. In addition, a start key K7 and a set change key K8 are displayed in the setting list D2. When the start key K7 is pressed, the display control unit 10 transmits contents of the setting list D2 to the main body control unit 9. Then, the main body control unit 9 recognizes the contents of the setting list D2 and controls the multifunction peripheral 100 in accordance with the recognized contents so as to perform copying. When the set change key K8 is pressed, for example, the setting screen DS1 of "sheet selection" is displayed again, so that the user can set again the set item included in the workflow.

[Menu Display Format]

Next, with reference to FIG. 7, the menu display format in the workflow will be described. For instance, FIG. 7 illustrates an example of the menu screen D3 in the menu display format when the "economy copy" workflow illustrated in FIG. 5 is called.

As illustrated in FIG. 7, for example, when the "economy copy" workflow is called, in the menu display format, a menu image i1 of "sheet selection", a menu image i2 of "delivery destination selection", a menu image i3 of "magnification", a menu image i4 of "aggregate", and a menu image i5 of "two-sided/division" are displayed. Therefore, menu images displayed on the menu screen D3 are different depending on a selected workflow. Then, a default set value is also displayed in each menu image. In this way, in the menu display format, set items included in the workflow are displayed as the menu.

The user presses a menu image of the set item whose set value is to be changed. Thus, the display of the liquid crystal display unit 11 is changed to the setting screen DS for each set item as illustrated in FIG. 6, for example. Then, when setting in the setting screen DS is completed, the display of the liquid crystal display unit 11 is changed to the menu screen D3 illustrated in FIG. 7 again.

In addition, an OK key K9 and a cancel key K10 are disposed in the menu screen D3. When the OK key K9 is pressed, the setting list D2 illustrated in FIG. 6 is displayed in the liquid crystal display unit 11. Details of the setting list D2 can be similar to the case described above with reference to FIG. 6, so overlapping description thereof is omitted. On the other hand, when the cancel key K10 is pressed, the setting using the workflow is canceled.

[List Display Format]

Next, with reference to FIG. 6, the list display format in the workflow will be described. In this list display format, when the workflow to be used is selected in the call screen D1 illustrated in FIG. 5, the setting list D2 illustrated in FIG. 6 is suddenly displayed on the liquid crystal display unit 11. Details of the setting list D2 can be similar to the case described above for the wizard display format with reference to FIG. 6, so overlapping description thereof is omitted.

In this way, the display unit (liquid crystal display unit 11) of the display input device (operation panel 1) displays in any one display format out of the wizard display format in which the set items included in the program are sequentially displayed in an interactive manner when the program is called, the list display format in which the set items included in the program are arranged and displayed in a list, and the menu format display in which images indicating the set items included in the program are displayed (in one screen).

(Creation and Registration of Workflow)

Figure 8:
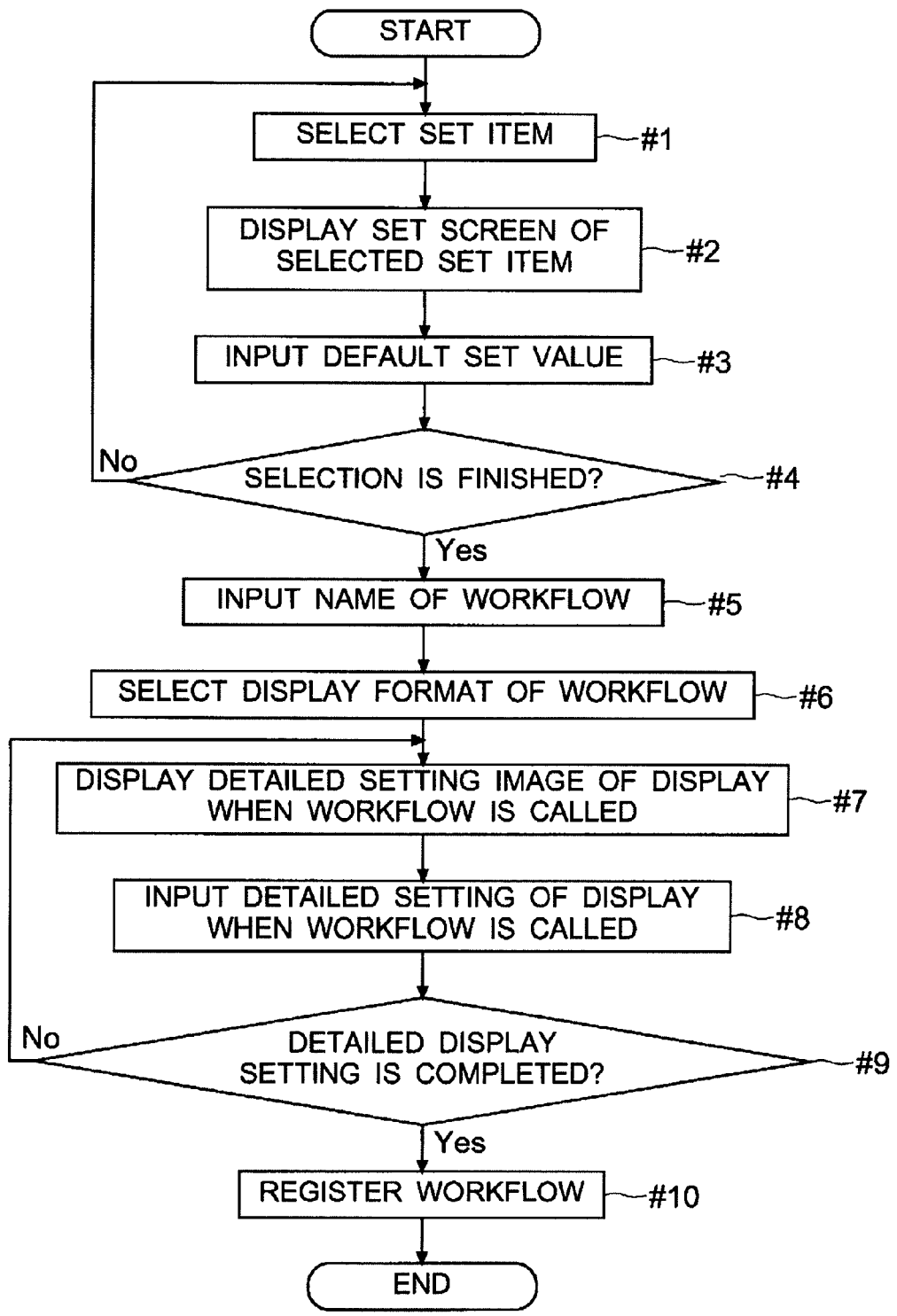
FIG. 8 is a flowchart illustrating an example of a process flow of creating and registering a workflow in the multifunction peripheral.

Next, with reference to FIGS. 8 to 18, an outline of creation and registration of the workflow in the multifunction peripheral 100 according to the embodiment of the present invention will be described. FIG. 8 is a flowchart illustrating an example of a process flow of creation and registration of the workflow in the multifunction peripheral 100 according to the embodiment of the present invention.

First, the process flow illustrated in FIG. 8 starts when a new registration of workflow is started (for example, when the workflow key 17 is pressed and the registration/edit key K1 is pressed in the call screen D1 (see FIG. 5), and other case). In other words, it starts when a mode of the operation panel 1 is changed from a normal input mode for setting copying or the like to a workflow registration mode. Next, the operation panel 1 accepts the input of selecting a set item to be included in the created workflow (Step #1). Then, the display control unit 10 and the main body control unit 9 recognize the selected set item.

[Selection of Set Item]

Here, an example of selection of the set item to be included in the workflow will be described with reference to FIGS. 9 and 10. FIGS. 9A and 9B are explanatory diagrams illustrating an example of a set item selection screen in creating a workflow about copying. FIG. 10 is an explanatory diagram illustrating an example of the set item selection screen in creating a workflow about transmission.

First, with reference to FIGS. 9A and 9B, selection of the set item when the workflow about copying is created will be described. As illustrated in FIGS. 9A and 9B, when the copy key 15 is pressed after the start illustrated in FIG. 8, for example, the liquid crystal display unit 11 displays a set item selection screen DF1 concerning the copy function. The liquid crystal display unit 11 displays a plurality of tabs such as a document/sheet/finish tab TB1, an image quality tab TB2, a layout/edit tab TB3, and an application/others tab TB4 in the selection screen DF1. Note that a plurality of types of tabs may be further disposed.

Figure 9A:
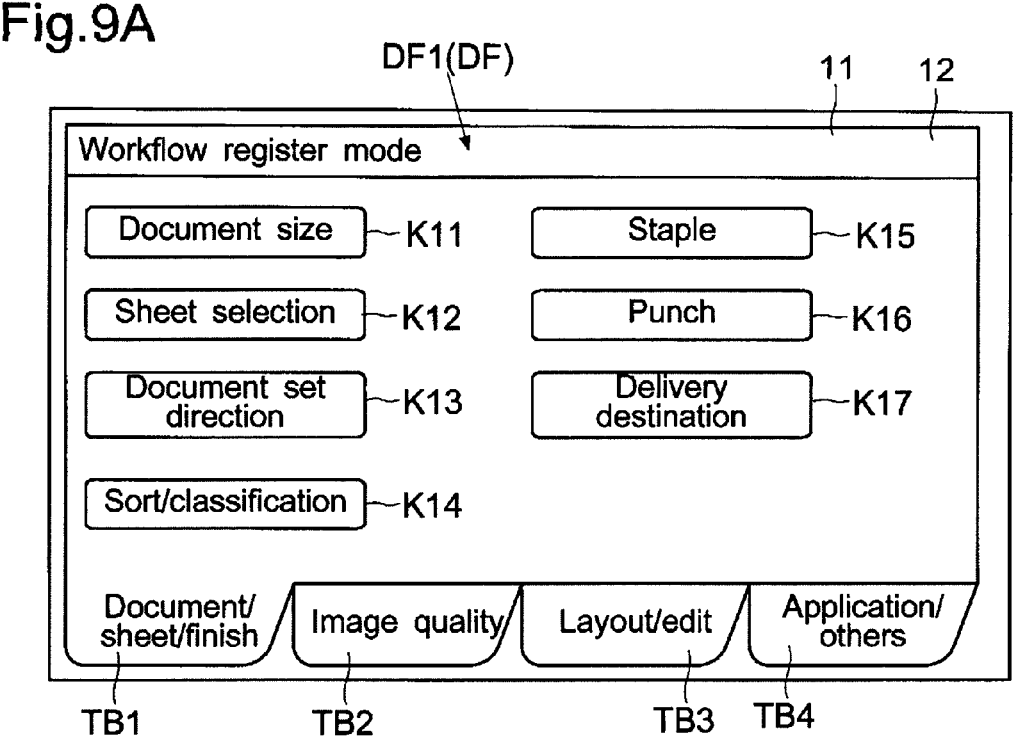
FIGS. 9A and 9B are explanatory diagrams illustrating an example of a set item selection screen in creating a workflow about copying.
Figure 10:
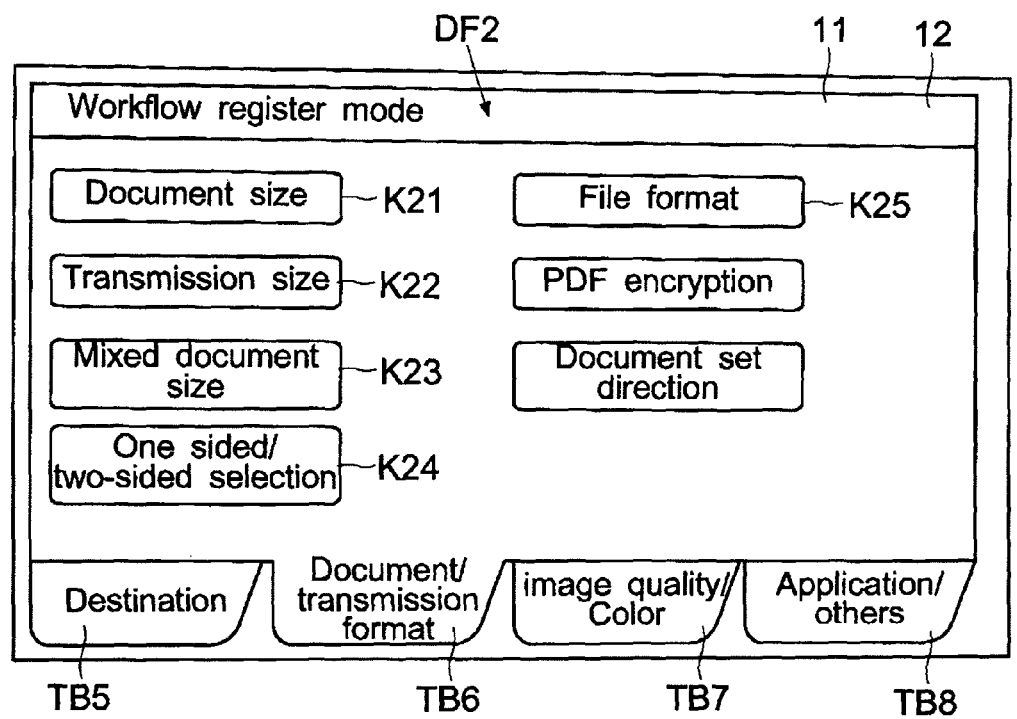
FIG. 10 is an explanatory diagram illustrating an example of a set item selection screen in creating a workflow about transmission.

For instance, when the document/sheet/finish tab TB1 is pressed, the liquid crystal display unit 11 displays set items concerning document/sheet/finish as illustrated in FIG. 9A. The set items are arranged as keys. For instance, when the document/sheet/finish tab TB1 is pressed, the liquid crystal display unit 11 displays a document size key K11 for setting a size of the document to be read, a sheet selection key K12 for setting paper sheets used for printing, a document set direction key K13 for setting a set direction of a document on the contact glass for place reading 32 or a document in the document feeding device 4, a sort/classification key K14 for setting the printing order of pages when a plurality of copies are printed, a staple key K15 for setting the stapling process, a punch key K16 for setting the punch process, and a delivery destination key K17 for setting a delivery destination.

Figure 9B:
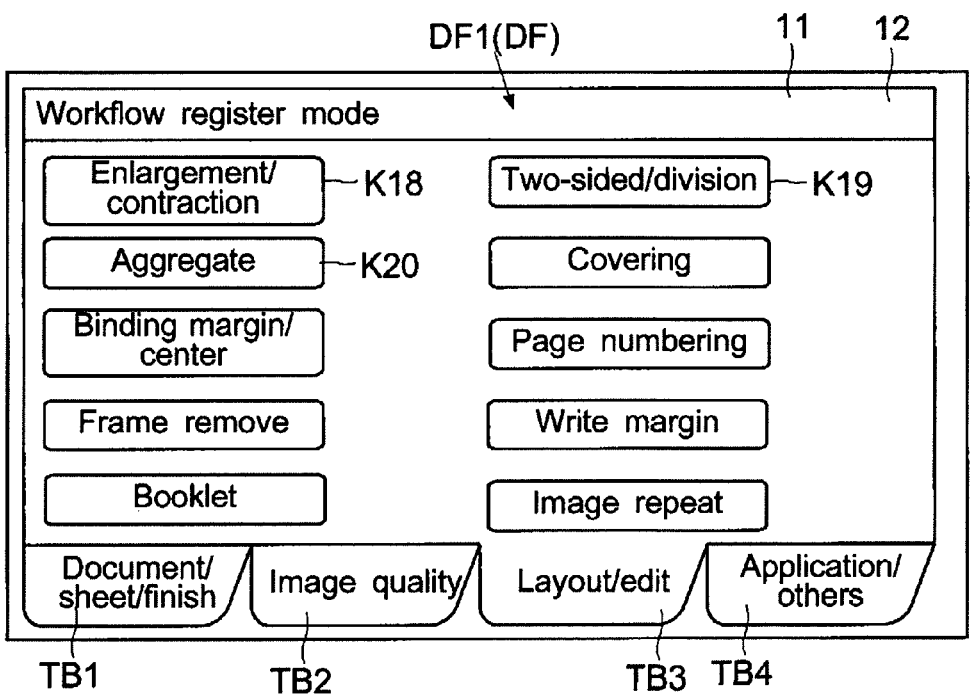

In addition, when the layout/edit tab TB3 is pressed, for example, the liquid crystal display unit 11 displays set items concerning layout and editing pages or images in copying as illustrated in FIG. 9B. Further, in this selection screen too, the set items are arranged as keys. For instance, when the layout/edit tab TB3 is pressed, the liquid crystal display unit 11 displays an enlargement/contraction key K18 for setting magnification of image such as enlargement or contraction, a two-sided/division key K19 for setting two-sided printing or division printing of a two-side printed document or two facing pages of a document, an aggregate key K20 for setting about copying a plurality of pages of a document into one page (the set contents are also assigned to other set item keys, but descriptions thereof are omitted). In addition, when the image quality tab TB2 is pressed, the liquid crystal display unit 11 displays a key corresponding to a set item concerning image quality (e.g., density setting). In addition, when the application/others tab TB4 is pressed, the liquid crystal display unit 11 displays practical set items concerning copying (e.g., mirror image printing, black and white reversal printing, and the like) as keys.

Next, with reference to FIG. 10, selection of the set item in the case where a workflow concerning transmission is created will be described. As illustrated in FIG. 10, for example, after the start illustrated in FIG. 8, when the transmission key 16 is pressed, the liquid crystal display unit 11 displays a set item selection screen DF2 (see FIG. 10) concerning the function of transmission of image data obtained by reading a document in fax or scanning.

For instance, as illustrated in FIG. 10, the liquid crystal display unit 11 displays plurality of tabs such as a destination tab TB5, a document/transmission format tab TB6, a color/image quality tab TB7, and a application/others tab TB8 in the selection screen DF2 for transmission. Note that a plurality of types of tabs may be further disposed.

For instance, the set items are arranged as keys. As illustrated in FIG. 10, when the document/transmission format tab TB6 is pressed, the liquid crystal display unit 11 displays a set item concerning a transmission form of a document to be read or the image data. Further, the liquid crystal display unit 11 displays a document size key K21 for setting a size of the document to be read, a transmission size key K22 for setting a size of image data to be transmitted, a mixed document size key K23 for setting whether or not to perform automatic detection of size of a document placed on the document feeding device 4 when it is not uniform, a single-sided/double-sided key K24 for setting whether the document is single side printed or double side printed and the number of pages included in image data for one page, and a file format key K25 for setting a form (e.g., PDF or TIFF) of image data to be transmitted (set contents are assigned also to keys of other set items, and description thereof are omitted).

When setting of the set items is performed in the selection screens DF (DF1, DF2 and the like), the display control unit 10 controls to display the setting screen DS for setting set values in the selected set item (Step #2). Then, the display control unit 10 recognizes a set value input for setting in the setting screen DS by the user (key indicating a pressed set value) as a default set value (Step #3).

[Setting of Default Set Value]

Here, with reference to FIGS. 11 and 12, an example of setting of a set value of a set item to be included in the workflow will be described. FIGS. 11A to 11C are explanatory diagrams illustrating an example of the setting screen DS of a set value in creating a workflow about copying. FIGS. 12A and 12B are explanatory diagrams illustrating an example of the setting screen DS of a set value in creating a workflow about transmission.

For instance, FIGS. 11A to 11C illustrate the setting screen DS6 of the set item for sheet selection (FIG. 11A), the setting screen DS7 of the set item for aggregate (FIG. 11B), and the setting screen DS8 of the set item for two-sided/division (FIG. 11C). In this way, the setting screen DS is prepared for each set item (other set items are omitted in the illustration).

For instance, FIG. 11A illustrates an example of the setting screen DS that is displayed when the sheet selection key K12 is pressed (when the set item of sheet selection is selected). In the setting screen DS6 for sheet selection, the liquid crystal display unit 11 displays an automatic sheet selection key K26 and keys indicating types of paper sheets in the paper sheet feeders 5a.

In addition, FIG. 11B illustrates an example of the setting screen DS7 that is displayed when the aggregate key K20 is pressed (when the set item of aggregate is selected). In the setting screen DS for aggregate, the liquid crystal display unit 11 displays keys for determining the number of pages to be aggregated into one page, which include a no setting key K27 (one page is included in one page), a 2 in 1 key K28 (two pages are aggregated into one page), a 4 in 1 key K29 (four pages are aggregated into one page). In addition, keys for determining a page layout and boundaries in aggregate are also displayed.

In addition, FIG. 11C illustrates an example of a setting screen DS8 that is displayed when the two-sided/division key K19 is pressed (when the set item of two-sided/division is selected). In the setting screen DS8 of the two-sided/division key K19, the liquid crystal display unit 11 displays a plurality of keys for determining forms of the two-sided print or the division printing.

The display control unit 10 controls to display the key pressed in each setting screen DS in a black and white reversal manner. Then, the display control unit 10 controls the liquid crystal display unit 11 to display an OK key K30 and a cancel key K31 in each setting screen DS, for example. When the OK key K30 is pressed, the display control unit 10 determines the set value that is currently set as a default set value in the workflow (e.g., in FIG. 11C, one-sided document to two-sided print in which two-sided printing is performed on the basis of the document that is printed on one side is regarded as the default set value).

Figure 12A:
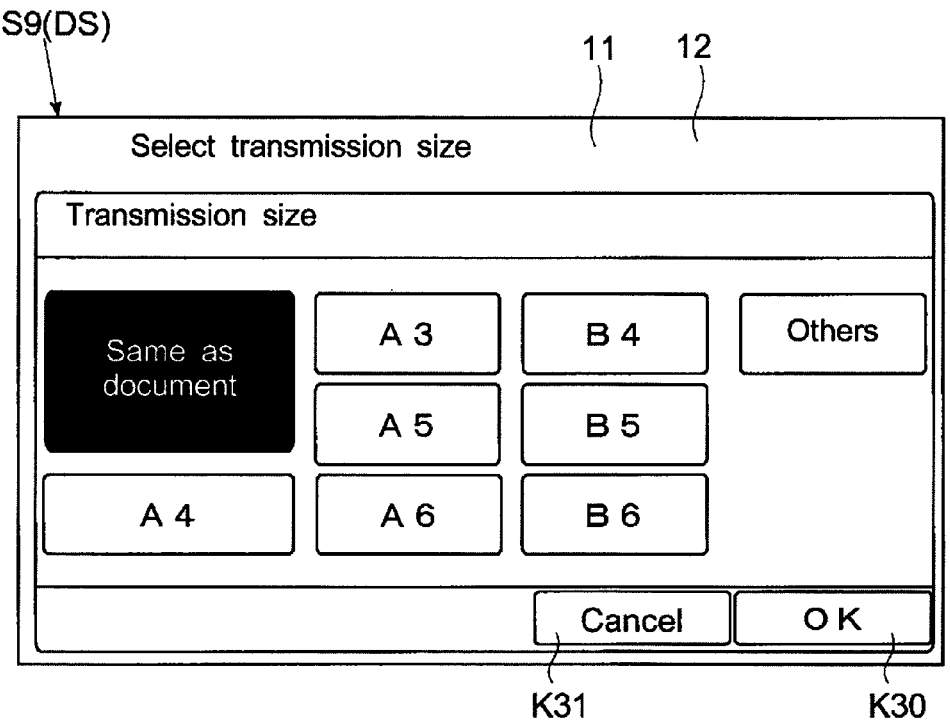
FIGS. 12A and 12B are explanatory diagrams illustrating an example of a set value setting screen in creating a workflow about transmission.

For instance, FIG. 12A illustrates the setting screen DS9 of the set item of transmission size (FIG. 12A) and the setting screen DS10 for transmission destination (address) (FIG. 12B), concerning transmission of image data. In this way, the setting screen DS is prepared for each set item concerning transmission too (other set items concerning transmission are omitted in illustration). In addition, also in the setting screen DS concerning transmission, there are disposed the OK key K30 that is pressed when the setting is approved and the cancel key K31 that is pressed when the setting is canceled.

For instance, FIG. 12A illustrates an example of the setting screen DS9 that is displayed when the transmission size key K22 is pressed (when the set item of transmission size is selected). For instance, in the setting screen DS9 of transmission size, the liquid crystal display unit 11 displays a plurality of keys for determining a size of image data obtained by reading a document.

Figure 12B:
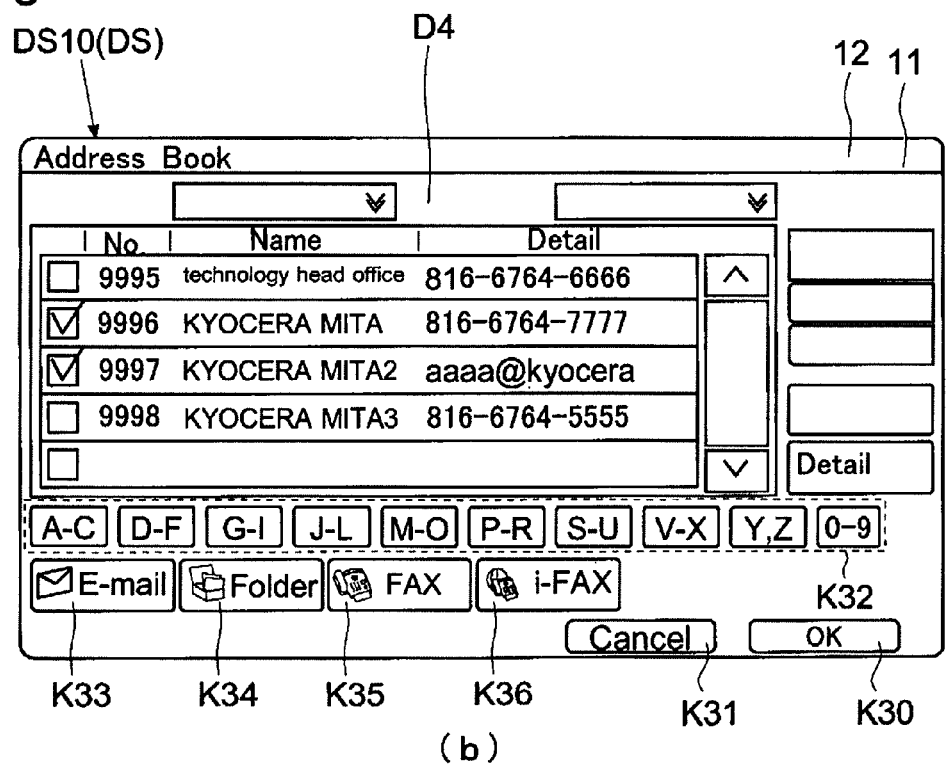

In addition, FIG. 12B illustrates an example of an address book screen D4 as the setting screen DS10 of transmission destination (address). When the destination tab TB5 is pressed, the liquid crystal display unit 11 displays the address book screen D4. For instance, the user can set one or more addresses by pressing the transmission destination information such as an address name, a fax number, an address, or the like that is displayed in the address book screen D4 (FIG. 12B illustrates a state where the specified transmission destination is checked, and it may be displayed in a black and white reversal manner). Then, the display control unit 10 recognizes the transmission destination specified in the address book screen D4 as a default transmission destination (address).

The address book screen D4 illustrated in FIG. 12B displays, for example, a plurality of first narrowing keys K32 for narrowing by the initial of the address name. Note that FIG. 12B illustrates a state after narrowing by "JKL".

The transmission destination information such as address names, fax numbers of addresses, e-mail addresses, network addresses, and the like are stored in the storage device 92. Note that the address name and transmission destination information corresponding to the same can be added by input using the operation panel 1. In addition, an external computer may transmit to the multifunction peripheral 100 via the I/F unit 93 data of a plurality of address names and transmission destination information corresponding to them so as to store the data in the storage device 92.

In addition, the liquid crystal display unit 11 displays in the address book screen D4 second narrowing keys for narrowing the transmission destination by a plurality of transmission methods. There are several types of second narrowing keys, including an E-mail key K33, a Folder key K34 (for storing the image data in a folder of a HDD of the external computer 200 or the storage device 92), a FAX key K35, and an i-FAX key K36 (the Internet fax).

When the second narrowing key is pressed, narrowing by the transmission method can be performed. Specifically, transmission destinations having no transmission destination information of the pressed transmission method are not displayed on the address book screen D4 (e.g., when the FAX key K35 is pressed, No. 9997 having an e-mail address as the transmission destination information is not displayed).

The display control unit 10 displays the key pressed in the setting screen DS of each set item in a black and white reversal manner. In addition, the display control unit 10 checks the selected address name or transmission destination information as the transmission destination. Then, the display control unit 10 controls to display the OK key K30 and the cancel key K31, for example, also in each setting screen DS concerning transmission. When the OK key K30 is pressed, the display control unit 10 determines the set value of the set address or the like to be a default set value in the workflow.

After setting the default set value of the set item in this way, the display control unit 10 checks whether or not the selection of the set item is finished (Step #4). Specifically, for example, the display control unit 10 checks whether or not an input for finishing the selection of set items to be included in the workflow is made. This input may be a plurality of types that can be determined arbitrarily. For instance, it is possible to adopt an input of pressing the start key 14 or the workflow key 17 in the set item selection screen DF. In addition, every time when the OK key K30 is pressed, a confirmation screen for the user to confirm that the selection of the set item can be finished may be displayed.

Figure 13:
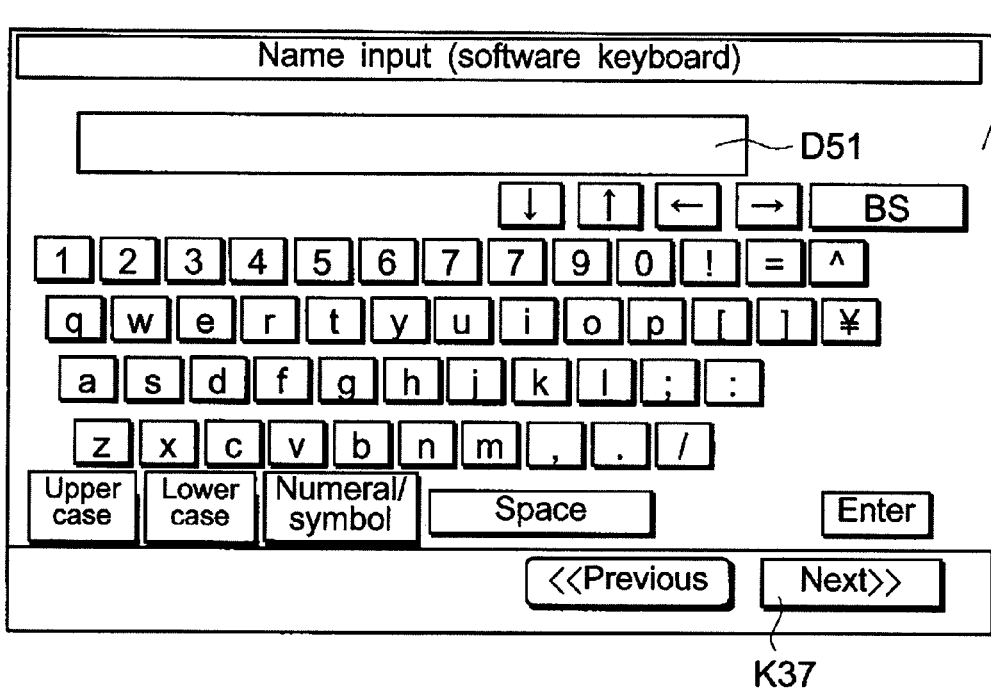
FIG. 13 is an explanatory diagram illustrating an example of a name input screen for the created workflow.

In the case where the selection of the set item to be included in the workflow is not finished (No in Step #4), the set item is added. Therefore, the process goes back to Step #1. On the other hand, when the selection of the set item to be included in the workflow is finished (Yes in Step #4), the display control unit 10 controls to display the name input screen D5 of the workflow as illustrated in FIG. 13. FIG. 13 is an explanatory diagram of an example of the name input screen D5 of the created workflow.

For instance, the user performs an input of naming the workflow by alphabets and symbols using a software keyboard in the name input screen D5 (Step #5). The display control unit 10 changes a display of a name display section D51 in accordance with the input by the user using the software keyboard. Then, for example, the display control unit 10 recognizes contents of the name display section D51 when the next key K37 is pressed as the name to be assigned to the workflow that is being created.

In addition, the display control unit 10 displays a display format determination screen D6 for determining a display format when the created workflow is called. The user selects a display format of the workflow (Step #6). For instance, the display control unit 10 displays a display format determination screen D6 as illustrated in FIG. 14.

Figure 14:
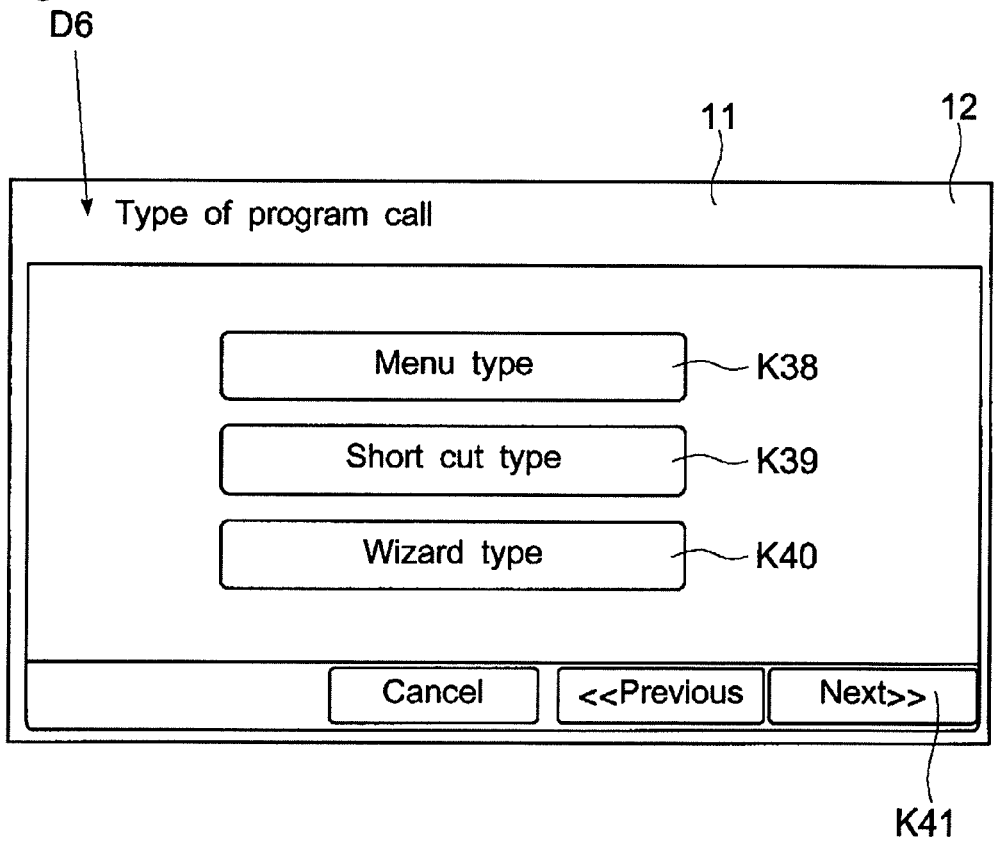
FIG. 14 is an explanatory diagram illustrating an example of a display format determination screen for determining a display format when a workflow is called.

FIG. 14 is an explanatory diagram illustrating an example of the display format determination screen D6 for determining the display format when the workflow is called. Specifically, the input unit (touch panel unit 12 or the like) accepts an input of selecting a display format when the program is called among at least two of the wizard display format, the list display format, and the menu display format when the program is created and registered, and the storage unit (storage device 92 or memory 101) stores the display format when the program is called as contents of the program. As a result, the display control unit 10 controls the display unit (liquid crystal display unit 11) to display the program in the selected display format when the program is called.

For instance, the user presses any one of a menu type key K38 (menu display format), a short cut type key K39 (list display format), and a wizard type key K40 (wizard display format) in the display format determination screen D6. The display control unit 10 recognizes a display format corresponding to the key selected when the next key K41 is pressed to be a display format of the workflow that is being created.

Figure 15:
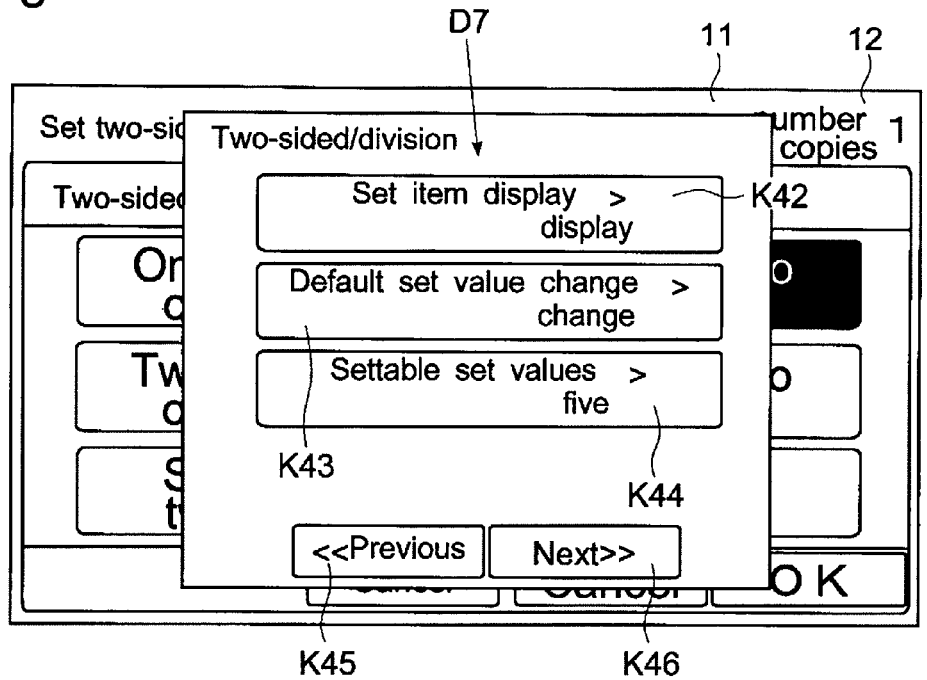
FIG. 15 is an explanatory diagram illustrating an example of a determination screen for determining about a display and a set value of a set item in a workflow.

Next, the display control unit 10 displays, for example, in order of selection of the set items, a detailed setting image D7 concerning the display when the workflow is called (Step #7, see FIG. 15). Then, the user performs detailed setting concerning the display when the workflow is called, by using the detailed setting image D7, and the setting is accepted (recognized) by the display control unit 10 (Step #8). For instance, when the set items are selected in order of the sheet selection, the aggregate, and the two-sided/division, as set items to be included in the workflow, the detailed setting image D7 concerning the display when the workflow is called is displayed in order of the sheet selection, the aggregate, and the two-sided/division.

[Detailed Setting Input of Display when Workflow is Called]

Figure 16:
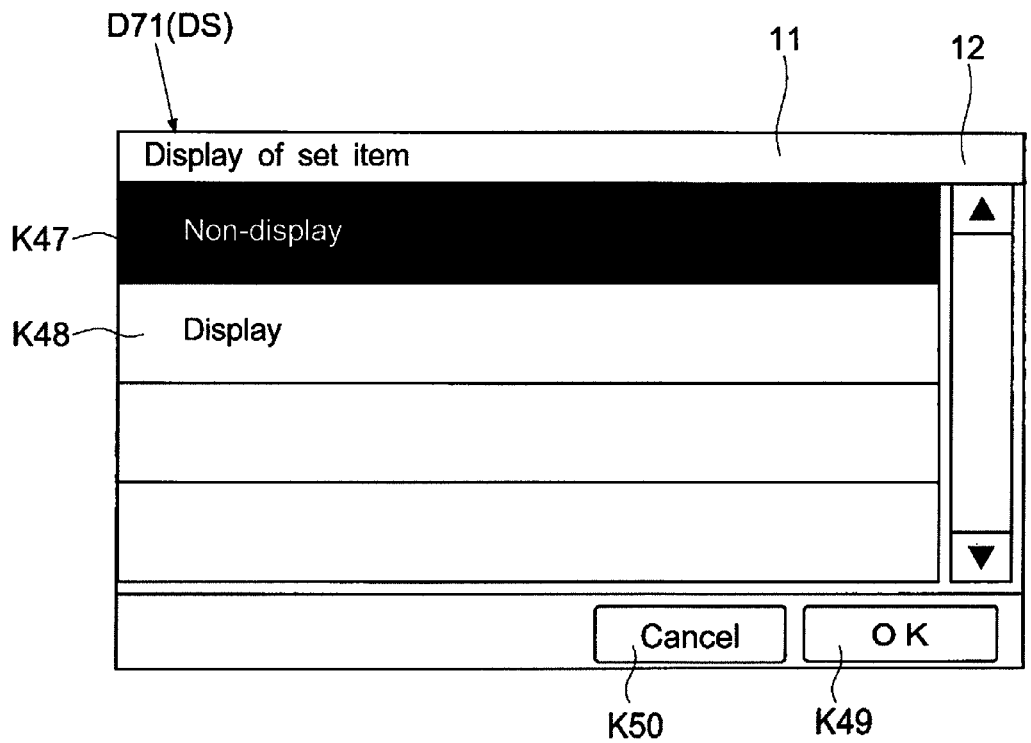
FIG. 16 is an explanatory diagram illustrating an example of a determination screen for determining about a display and a set value of a set item in a workflow.
Figure 17:
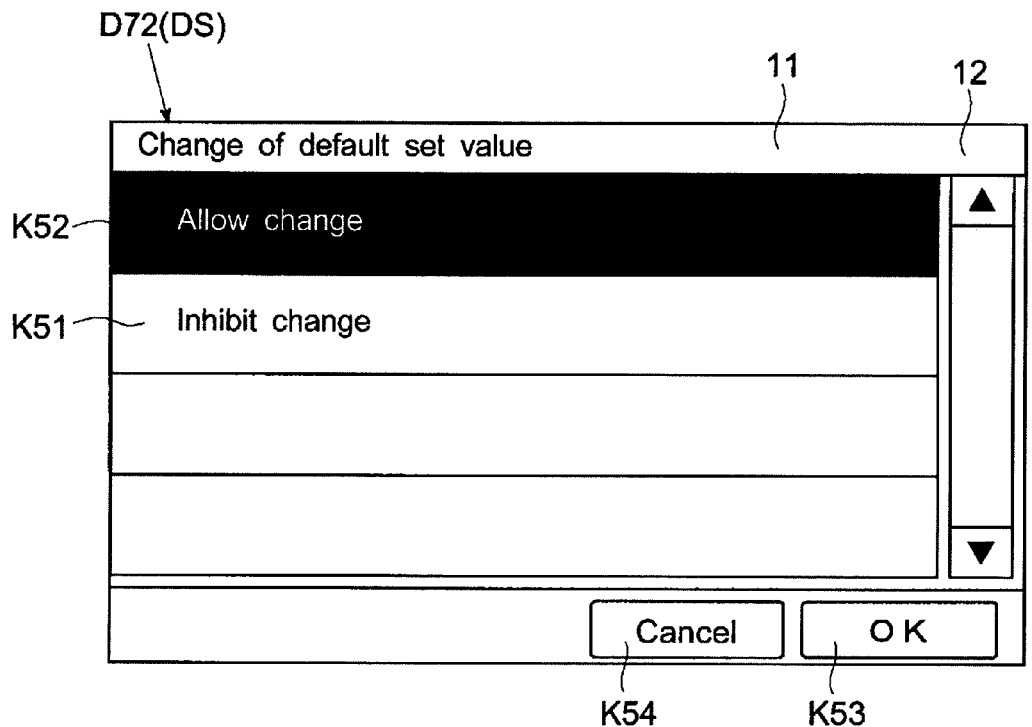
FIG. 17 is an explanatory diagram illustrating an example of a determination screen for determining about a display and a set value of a set item in a workflow.
Figure 18:
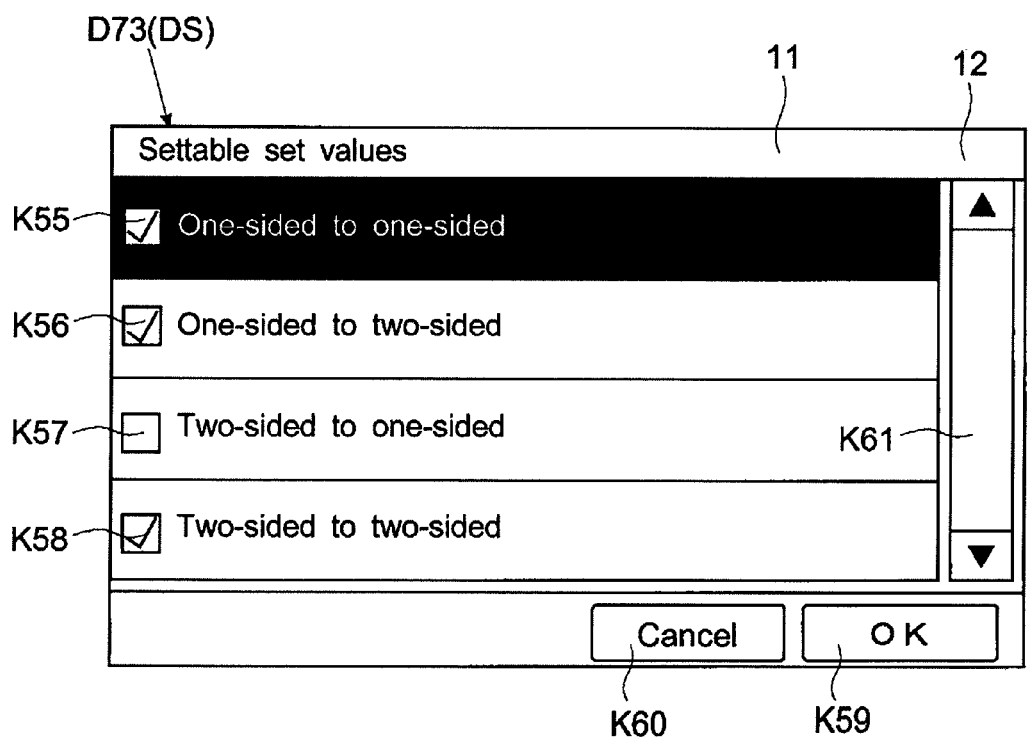
FIG. 18 is an explanatory diagram illustrating an example of a determination screen for determining about a display and a set value of a set item in a workflow.

Here, with reference to FIGS. 15 to 18, detailed setting concerning the display when the workflow is called will be described. FIG. 15 is an explanatory diagram illustrating an example of the determination screen for determining the display of set item in the workflow and the set value. FIGS. 16 to 18 are explanatory diagrams illustrating an example of the determination screen for determining the display of set item in the workflow and the set value. Note that as an example of the set item, the set item of two-sided/division concerning copying is exemplified.

As illustrated in FIG. 15, for example, a detailed setting image D7 for performing the detailed setting concerning the display when the workflow is called is overlaid and displayed on the setting screen DS of the set items included in the workflow that is being created. The liquid crystal display unit 11 displays, for example, five keys including a set item display key K42, a default set value change key K43, a settable set value key K44, a previous key K45, and a next key K46, in the detailed setting image D7.

When the set item display key K42 is pressed, the display control unit 10 controls to display a detailed setting screen D71 as illustrated in FIG. 16, for example. In this detailed setting screen D71, it is possible to set whether to display the set item or not when the workflow is called. Then, the liquid crystal display unit 11 displays a non-display key K47 (key assigned with "non-display"), a display key K48 (key assigned with "display"), an OK key K49, and a cancel key K50 in the detailed setting screen D71.

For instance, when the non-display key K47 is pressed and then the OK key K49 is pressed, it is possible to configure so that the set item and the setting screen DS thereof are not displayed at all when the called workflow is performed by the menu display format or the wizard display format. Thus, it is possible to configure so as to prevent the set item from being removed or the set value from being changed when the workflow is called. On the other hand, when the display key K48 is pressed and then the OK key K49 is pressed, the set item is displayed in the case where the called workflow is performed by the menu display format or the wizard display format.

Next, when the default set value change key K43 is pressed, the display control unit 10 controls the liquid crystal display unit 11 to display a detailed setting screen D72 as illustrated in FIG. 17, for example. In this detailed setting screen D72, it is possible to set whether or not change of the default set value is allowed when the workflow is called. Then, the liquid crystal display unit 11 displays a change inhibit key K51 (key assigned with "inhibit change"), a change allow key K52 (key assigned with "allow change"), an OK key K53, and a cancel key K54 in the detailed setting screen D72.

For instance, when the change inhibit key K51 is pressed, and then the OK key K53 is pressed, it is possible that the set item and the setting screen DS thereof are displayed but the default set value cannot be changed (from the set value that is set when the workflow is created) in the case where the called workflow is performed by the menu display format or the wizard display format.

In view of reducing consumption of resources even in the case where a person who is not accustomed to the work or the operation of the multifunction peripheral 100 (e.g., a part-time worker or a new comer) performs copying, it is possible to force the person to perform always the aggregate print or the two-sided print. In addition, since the transmission destination (set value of address) cannot be changed, it is possible to prevent a wrong transmission even in the case where a person who is not accustomed to the work or the operation of the multifunction peripheral 100 performs data transmission. In other words, it is possible to avoid occurrence of an operation mistake that is not expected by the creator of the workflow. On the other hand, when the change allow key K52 is pressed and then the OK key K53 is pressed, the default set value can be changed in the case where the called workflow is performed by the menu display format or the wizard display format.

Next, when the settable set value key K44 is pressed, the display control unit 10 displays the detailed setting screen D73 as illustrated in FIG. 18, for example. By this setting in the detailed setting screen D73, it is possible to restrict the settable set value when the change of the default set value is allowed when the workflow is called. For instance, in the set item of two-sided/division, a plurality of set values can be selected concerning the two-sided print. In this case, the liquid crystal display unit 11 displays a key indicating the set value included in the set items of the two-sided/division, an OK key K59, a cancel key K60, and the like are in the detailed setting screen D73. Specifically, the liquid crystal display unit 11 displays a one-sided to one-sided key K55 (corresponding to one-sided document to one-sided print), a one-sided to two-sided key K56 (corresponding to one-sided document to two-sided print), a two-sided to one-sided key K57 (corresponding to two-sided document to one-sided print), a two-sided to two-sided key K58 (corresponding to one-sided document to one-sided print) and the like. Note that if they are displayed in one screen, other keys (e.g., spread document to two-sided print and the like) may be displayed by using a scroll bar K61 on the right side of the detailed setting screen D73.

Then, when the workflow is called, the display control unit 10 controls the liquid crystal display unit 11 to display the key pressed by the user as a set value to be settable in a manner of being checked in a check box disposed at the left side of each key (or in a black and white reversal display). When the OK key K59 is pressed, in the case where the called workflow is performed by the menu display format or the wizard display format, it is possible to set only the set value that is checked.

Thus, unlimited change of set values can be avoided, so that it is possible to prevent wasteful copying or wrong transmission of image data due to unnecessary setting of set values by a person who is not accustomed to the work or the operation of the multifunction peripheral 100.

In this way, the display control unit 10 accepts detailed setting concerning the display when the workflow is called (Step #8). Then, the display control unit 10 checks whether or not the detailed display setting is performed (is completed) when the workflow is called for every set item included in the workflow that is being created every time when the next key K46 in the detailed setting image D7 is pressed, for example (Step #9). For this checking, the display control unit 10 checks whether or not the next key K46 is pressed in the set item of the final display order. On the other hand, the display control unit 10 decides that the setting is not completed in the case where the next key K46 is pressed in the set item before the set item of the last display order.

If the setting is not completed (No in Step #9), the process goes back to Step #7, for example, in which the detailed setting is performed for the set item. On the contrary, if the setting is completed (Yes in Step #9), the storage device 92 or the memory 101 stores the created workflow so that the workflow is registered (Step #10 to END). For instance, the display control unit 10 sends data indicating a name of the workflow, a display format of the same, set items included in the same, a display order of the set items (that agrees with the selection order of the set items when the workflow is created), a default set value in the set item, discrimination between a set item that is displayed when calling and a set item that is not displayed, whether or not the set value can be changed in each set item, and a set value that can be selected when the set value is changeable to the main body control unit 9, so that the storage device 92 or the memory 101 can store the same as a program. After that, the operation panel 1 goes back to a normal input mode from a workflow register mode (END)

In other words, the display input device (operation panel 1) includes a display unit (liquid crystal display unit 11) which displays a plurality of types of executable functions as set items, a storage unit (storage device 92, memory 101) which stores a program for controlling the display unit to display a screen that is a combination of set items selected from the plurality of set items and registered in advance and is called for setting the set items selected and registered in advance, an input unit (touch panel unit 12 or the like) which accepts an input for selecting the set items to be included in the program when the program is created and registered, and accepts an input about whether or not to display the set items included in the program when the program is called, and a display control unit 10 which controls displays on the display unit and recognizes an input performed by the input unit. The storage unit stores information about whether or not to display the set items included in the program when the program is called as contents of the program. As a result, the display control unit 10 controls the display unit (liquid crystal display unit 11) not to display the set item that is determined to be no display when the program is called.

In addition, the input unit (touch panel unit 12 or the like) accepts an input for setting the default set value in the selected set item to be included in the program when the program is created and registered, and accepts an input about whether or not to allow a change of the default set value of the set item included in the program when the program is called. The storage unit (storage device 92, memory 101) stores information about whether or not to allow a change of the default set value of the set item included in the program when the program is called as contents of the program. As a result, the display control unit 10 does not accept (ignore) an input for changing the default set value whose change has been inhibited when the program is called.

Further, when the program is create and registered, the input unit (touch panel unit 12 or the like) accepts an input for determining selectable set values among a plurality of set values in the set item selected to be included in the program when the program is called. The storage unit (storage device 92, memory 101) stores selectable set values among set items included in the program when the program is called as contents of the program. The display control unit 10 accepts an input for setting only the set value to be selectable when the program is called (an input for a set value that cannot be selected is ignored).

(Process Flow when Workflow is Called)

Figure 19:
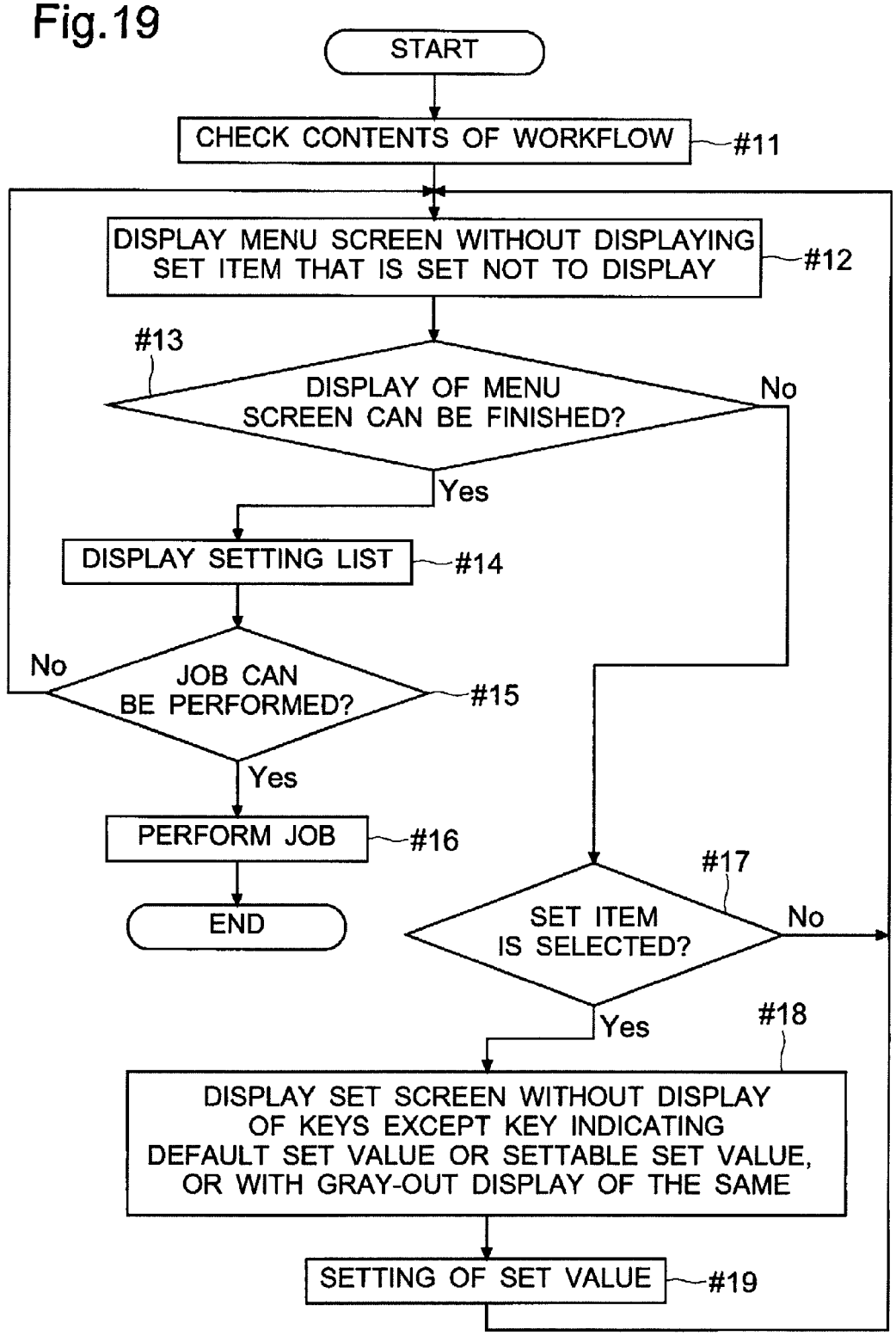
FIG. 19 is a flowchart illustrating an example of a process flow when a workflow in the menu display format is called in the multifunction peripheral.
Figure 20:
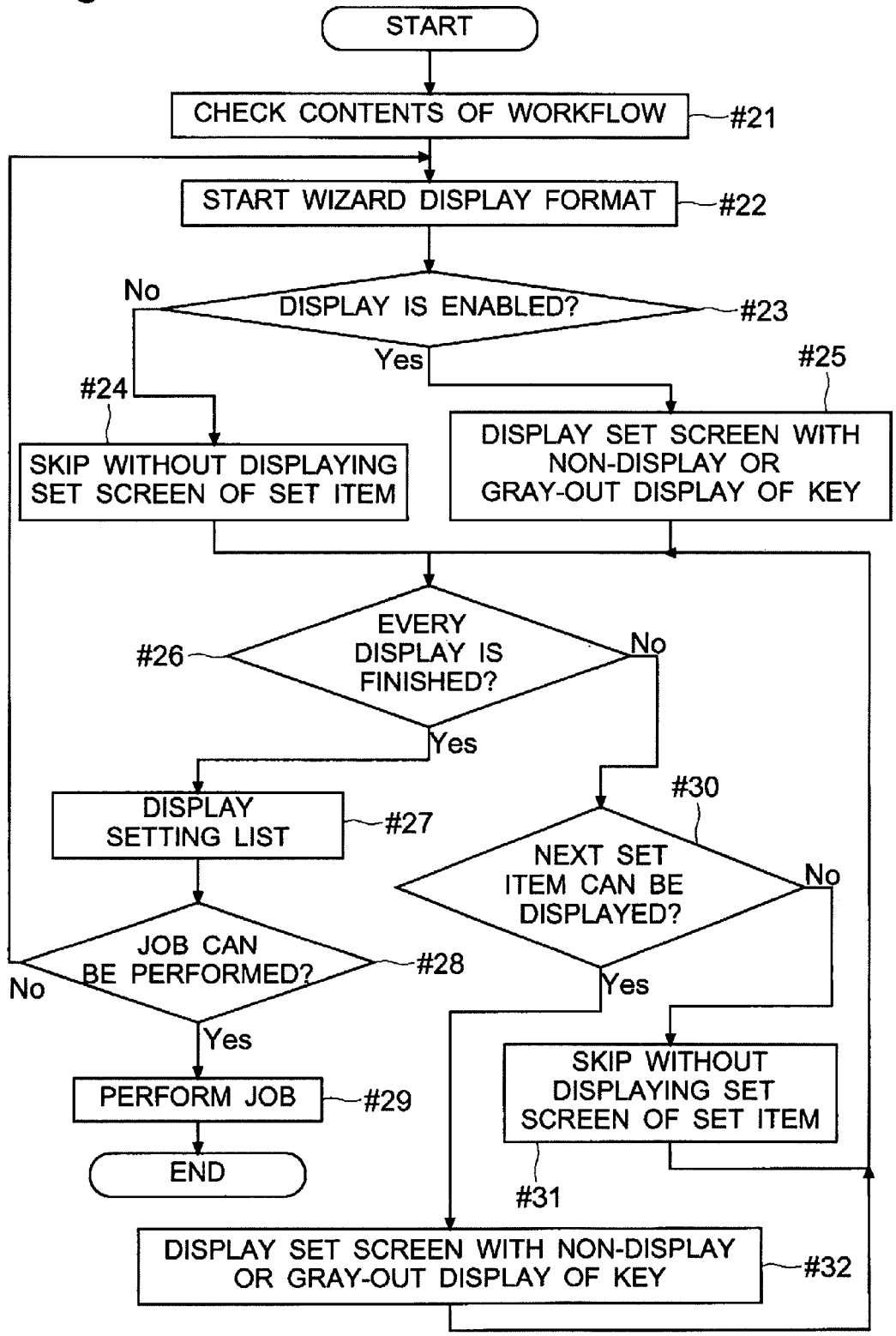
FIG. 20 is a flowchart illustrating an example of a process flow when a workflow in the wizard display format is called in the multifunction peripheral.
Figure 21:
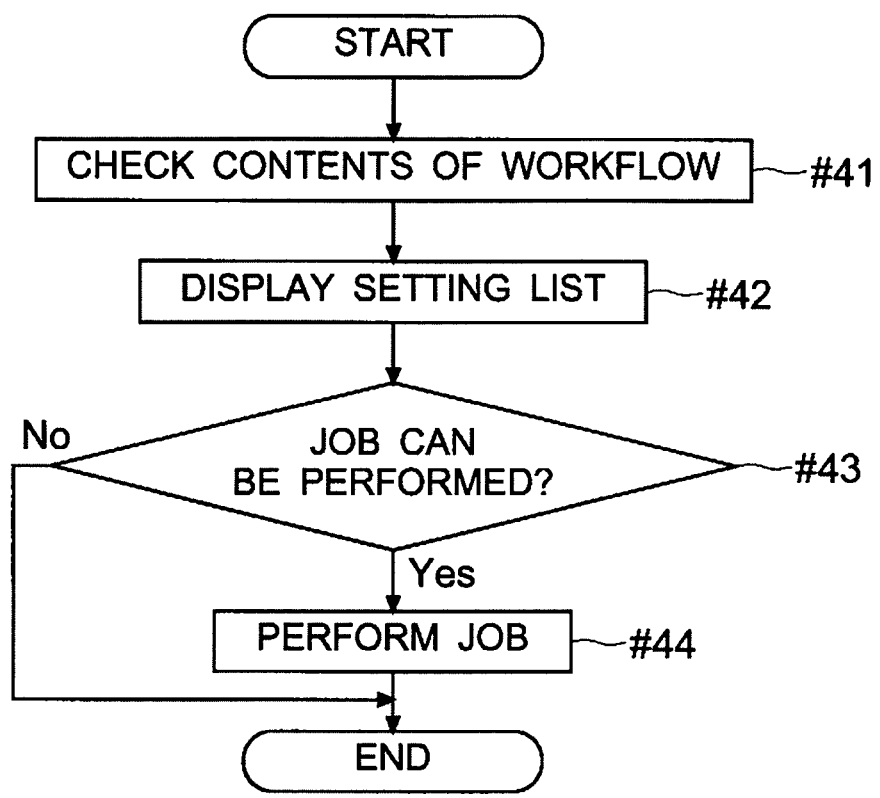
FIG. 21 is a flowchart illustrating an example of a process flow when a workflow in the list display format is called in the multifunction peripheral.

Next, an example of a process flow when a workflow is called in the multifunction peripheral 100 according to an embodiment of the present invention will be described with reference to FIGS. 19 to 21. FIG. 19 is a flowchart illustrating an example of a process flow when a workflow is called in the multifunction peripheral 100 according to an embodiment of the present invention. FIG. 20 is a flowchart illustrating an example of a process flow when a workflow in the wizard display format is called in the multifunction peripheral 100 according to the embodiment of the present invention. FIG. 21 is a flowchart illustrating an example of a process flow when a workflow in the list display format is called in the multifunction peripheral 100 according to the embodiment of the present invention.

[Menu Display Format]

First, with reference to FIG. 19, an example of a process flow of a display when a workflow is called and displayed in the menu display format will be described. For instance, the process flow illustrated in FIG. 19 starts when the workflow key 17 (see FIG. 3) is pressed, the display control unit 10 recognizes (accepts) the input for selecting the workflow to be used (to be called) among workflows registered in advance, and the display format of the workflow is the menu display format.

Next, the display control unit 10 checks contents of the workflow registered as a program in the storage device 92 or the memory 101 (Step #11). Then, the display control unit 10 controls the liquid crystal display unit 11 to display the menu screen D3 without displaying the set item as a menu that is set not to display (see Step #12 in FIG. 7).

Then, the display control unit 10 checks whether or not to finish the display of the menu screen D3 because the user presses the OK key K9 after confirming the default set value or the like, for example (Step #13). If the display of the menu screen D3 can be finished (Yes in Step #13), the setting list D2 is displayed (Step #14).

Then, the display control unit 10 checks whether or not to perform the job (Step #15). Specifically, the display control unit 10 checks whether or not the start key K7 (see FIG. 6) or the start key 14 is pressed. When the set change key K8 is pressed (see FIG. 6) and the job should not be performed (No in Step #15), the display control unit 10 controls the liquid crystal display unit 11 to display the menu screen D3 (the process goes back to Step #12). If the job may be performed (Yes in Step #15), the job is performed in accordance with the set item in the workflow and each set value (Step #16), and the process is finished (END).

On the other hand, if the display of the menu screen D3 is not finished (No in Step #13), the display control unit 10 checks whether or not the set item is selected by selection of the menu image in the menu screen D3 (Step #17). If the set item is not selected (No in Step #17), the process goes back to Step #12, for example. On the other hand, if the set item is selected (Yes in Step #17), the display control unit 10 controls the liquid crystal display unit 11 to display the setting screen DS with no display or gray-out display of keys except the key indicating the default set value or the settable set value in the case where the change of the default set value is inhibited or the case where the settable set value is determined (Step #18). Then, the user sets the set value (Step #19), and the menu screen D3 is displayed again (to Step #12).

[Wizard Display Format]

Next, with reference to FIG. 20, an example of a process flow of a display when a workflow is called and displayed in the wizard display format will be described. For instance, the process flow illustrated in FIG. 20 starts when the workflow key 17 (see FIG. 3) is pressed, the display control unit 10 recognizes (accepts) the input for selecting the workflow to be used (to be called) among workflows registered in advance, and the display format of the workflow is the wizard display format.

Next, the display control unit 10 checks contents of the workflow registered as a program in the storage device 92 or the memory 101 (Step #21). The display control unit 10 starts to display in the wizard display format (Step #22). Then, the display control unit 10 checks contents of the workflow so as to check whether or not to display the setting screen DS of the first set item (Step #23).

If the set item to be displayed first is set to be no display when the workflow is created and registered (No in Step #23), the display control unit 10 skips the display of the setting screen DS of the first set item (Step #24). On the contrary, if the set item can be displayed (Yes in Step #23), the display control unit 10 controls the liquid crystal display unit 11 to display the setting screen DS of the first set item among the set items included in the workflow with no display or gray-out display of keys except the key indicating the default set value or the settable set value in the case where the change of the default set value is inhibited or the case where the settable set value is determined (Step #25).

Next to Step #24 and Step #25, when the next key K6 is pressed, the display control unit 10 checks whether or not the setting screen DS of every set item that is included in the workflow and is to be displayed is displayed (Step #26). If the setting screen DS of every set item is displayed, the display control unit 10 controls to display the setting list D2 (Step #27).

Then, the display control unit 10 checks whether or not to perform the job (Step #28). Specifically, the display control unit 10 checks whether or not the start key K7 (see FIG. 6) or the start key 14 is pressed. When the set change key K8 is pressed (see FIG. 6) and the job should not be performed (No in Step #28), the display control unit 10 starts the display in the wizard display format again, for example (the process goes back to Step #22). If the job may be performed (Yes in Step #28), the job is performed in accordance with the set item in the workflow and each set value (Step #29), and the process is finished (END).

On the other hand, if the setting screen DS of every set item to be displayed is not displayed (No in Step #26), it is checked whether or not to display the setting screen DS of the next set item (Step #30). If it is determined to be no display when the workflow is created and registered (No in Step #30), the display control unit 10 skips the display of the setting screen DS of the next set item (Step #31). On the contrary, if the set item can be displayed (Yes in Step #30), the display control unit 10 controls the liquid crystal display unit 11 to display the setting screen DS of the first set item among the set items included in the workflow with no display or gray-out display of keys except the key indicating the default set value or the settable set value in the case where the change of the default set value is inhibited or the case where the settable set value is determined (Step #32). After that, the set value is set, for example, and the process goes to Step #26.

[List Display Format]

Next, with reference to FIG. 21, an example of a process flow of a display when a workflow is called and displayed in the list display format will be described. For instance, FIG. 21 starts when the workflow key 17 (see FIG. 3) is pressed, the display control unit 10 recognizes (accepts) the input for selecting the workflow to be used (to be called) among workflows registered in advance, and the display format of the workflow is the list display format.

Next, the display control unit 10 checks contents of the workflow registered as a program in the storage device 92 or the memory 101 (Step #41). Next, the display control unit 10 controls to display the setting list D2 (Step #42). Then, the display control unit 10 checks whether or not to perform the job (Step #43). Specifically, the display control unit 10 checks whether or not the start key K7 (see FIG. 6) or the start key 14 is pressed.

If the set change key K8 is pressed (see FIG. 6) and the job should not be performed (No in Step #43), the display control unit 10 finishes the display control in the list display format, for example (END). Then, the display control unit 10 performs the display control in the wizard display format and the menu display format (see FIGS. 19 and 20). In this case, any one of the wizard display format and the menu display format may be adopted. In addition, In this case, it is possible that the user selects the wizard display format or the menu display format for the display. On the other hand, if the job may be performed (Yes in Step #43), the job is performed in accordance with the set item in the workflow and each set value (Step #44), and the process is finished (END).

In this way, in the menu display format or the wizard display format, the display control unit 10 controls the display unit (liquid crystal display unit 11) to display the set values except the set value that is inhibited to change in a non-selectable manner (e.g., in a gray-out state) in the setting screen DS of each set item, or controls the display unit (liquid crystal display unit 11) not to display the same, when the program is called. In addition, when the program is called, the display control unit 10 controls the display unit (liquid crystal display unit 11) to display the set values except the set value that is set to be selectable in a non-selectable manner (e.g., in a gray-out state) in the setting screen DS of each set item, or controls the display unit (liquid crystal display unit 11) not to display the same, when the program is called.

Although the embodiment of the present invention is described above, the scope of the present invention is not limited to the embodiment, which can be embodied in the scope of present invention without deviating from the spirit thereof.

What is claimed is:

1. A display input device comprising:
    a display unit which displays a plurality of types of executable functions as set items;
    a storage unit which stores a program for controlling the display unit to display a screen that is a combination of set items selected from a plurality of set items and registered in advance and that is called for setting a set item selected and registered in advance, and which stores information about whether or not to display a set item included in the program when the program is called as contents of the program;
    an input unit which accepts an input for selecting a set item to be included in the program when the program is created and registered, and accepts an input for determining whether or not to display a set item to be included in the program when the program is called; and
    a display control unit which controls displays on the display unit, and recognizes an input accepted by the input unit, so as to control the display unit not to display a set item that is determined not to be displayed when the program is called,
    wherein, when the program is called, the display unit adopts a display format from formats including a wizard display format in which set items included in the program are displayed sequentially in an interactive manner, a list display format in which set items included in the program are arranged and displayed in a list, and a menu display format in which images indicating set items included in the program are displayed.

2. A display input device according to claim 1, wherein
the input unit accepts an input for setting a default set value in a selected set item to be included in the program when the program is created and registered, and accepts an input for determining whether or not to allow a change of a default set value of a set item included in the program when the program is called,
the storage unit stores information for determining whether or not to allow a change of a default set value of a set item included in the program when the program is called as contents of the program, and
the display control unit does not recognize an input for changing a default set value whose change has been inhibited when the program is called.

3. A display input device according to claim 2, wherein when the program is called, the display control unit controls the display unit to display or not display set values except a default set value whose change has been inhibited in the set screen of a set item in a non-selectable manner.

4. A display input device according to claim 1, wherein
when the program is created and registered, the input unit accepts an input for determining a selectable set value in the called program among a plurality of set values in a set item selected to be included in the program;
the storage unit stores a selectable set value among set items included in the program when the program is called as contents of the program, and
the display control unit accepts an input for setting only a set value to be selectable when the program is called.

5. A display input device according to claim 4, wherein when the program is called, the display control unit controls the display unit to display set values except a set value that is set to be selectable in a non-selectable manner in the set screen of a set item, or controls the display unit not to display set values except a set value that is set to be selectable.

6. A display input device according to claim 1, wherein
when the program is created and registered, the input unit accepts an input for selecting a display format when the program is called from at least two of the wizard display format, the list display format, and the menu display format,
the storage unit stores the display format when the program is called as contents of the program, and
the display control unit controls the display unit to display the program in the selected display format when the program is called.

7. An image forming apparatus comprising the display input device according to claim 1.

8. A displaying method of a display input device, comprising the steps of:
displaying a plurality of types of executable functions as set items;
storing a program which controls the display unit to display a screen that is a combination of set items selected from a plurality of set items and registered in advance and that is called for setting a set item selected and registered in advance;
storing information for determining whether or not to display a set item included in the program when the program is called as contents of the program;
accepting an input for selecting a set item to be included in the program when the program is created and registered;
accepting an input for determining whether or not to display a set item to be included in the program when the program is called;
controlling not to display a set item that is determined not to be displayed when the program is called; and
controlling, when the program is called, to display in at least one of a wizard display format in which set items included in the program are displayed sequentially in an interactive manner, a list display format in which set items included in the program are arranged and displayed in a list, and a menu display format in which images indicating set items included in the program are displayed.

9. A displaying method of a display input device according to claim 8, further comprising the steps of:
accepting an input for setting a default set value in a selected set item to be included in the program when the program is created and registered;
accepting an input for determining whether or not to recognize a change of a default set value of a set item included in the program when the program is called;
storing information about whether or not to recognize a change of a default set value of a set item included in the program when the program is called as contents of the program; and
controlling not to recognize an input for changing a default set value whose change has been inhibited when the program is called.

10. A displaying method of a display input device according to claim 9, further comprising the step of controlling to display or not display set values except a default set value whose change has been inhibited in a non-selectable manner.

11. A displaying method of a display input device according to claim 8, further comprising the steps of:
accepting an input for determining a set value that is selectable in the call program among a plurality of set values in a selected set item to be included in the program, when the program is created and registered;
storing a selectable set value among set items included in the program when the program is called as contents of the program; and
recognizing an input for setting only a set value that is determined to be selectable when the program is called.

12. A displaying method of a display input device according to claim 11, further comprising the step of controlling to display set values except a set value determined to be selectable in a non-selectable manner in the set screen of a set item when the program is called, or not to display set values except a set value determined to be selectable.

13. A displaying method of a display input device according to claim 8, further comprising the steps of:
accepting an input for selecting a display format when the program is called from at least two of the wizard display format, the list display format, and the menu display format, when the program is created and registered;
storing a display format when the program is called as contents of the program; and
controlling to display the program in a selected display format when the program is called.

* * * * *